US006934119B2

(12) United States Patent
Kohyama et al.

(10) Patent No.: US 6,934,119 B2
(45) Date of Patent: Aug. 23, 2005

(54) DISK DRIVE

(75) Inventors: Takuro Kohyama, Tokyo (JP);
Yoshiyuki Ohishi, Tokyo (JP); Kiyoshi Mori, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 232 days.

(21) Appl. No.: 10/049,649

(22) PCT Filed: Jun. 26, 2001

(86) PCT No.: PCT/JP01/05453

§ 371 (c)(1),
(2), (4) Date: Feb. 25, 2002

(87) PCT Pub. No.: WO02/01557

PCT Pub. Date: Jan. 3, 2002

(65) Prior Publication Data

US 2002/0114106 A1 Aug. 22, 2002

(30) Foreign Application Priority Data

Jun. 27, 2000 (JP) ........................................ 2000-199396

(51) Int. Cl.$^7$ .............................................. G11B 17/02
(52) U.S. Cl. .................................................. 360/99.06
(58) Field of Search .......................... 360/99.06, 99.02, 360/99.07, 99.03

(56) References Cited

U.S. PATENT DOCUMENTS 4,878,139 A * 10/1989 Hasegawa et al. ........ 360/99.02

5,859,747 A  1/1999 Sawada
6,233,114 B1  5/2001 Komatsu et al.

FOREIGN PATENT DOCUMENTS

| EP | 0 886 271 A1 | 12/1998 |
| JP | 4-276352 | 10/1992 |
| JP | 11-283307 | 10/1999 |

* cited by examiner

*Primary Examiner*—Robert S. Tupper
(74) *Attorney, Agent, or Firm*—Armstrong, Kratz, Quintos, Hanson & Brooks, LLP

(57) ABSTRACT

A disk drive apparatus according to the present invention includes a horizontal guide mechanism and a vertical guide mechanism, which are disposed between a frame (10) and a slider (60) for slidably guiding the slider (60). The horizontal guide mechanism includes an engaging piece (69b) disposed in at least one of the frame (10) and the slider (60) and an engaging hole (24a), which is disposed in the other and is engaged with the engaging piece (69b). One of the frame (10) and the slider (60), in which the engaging piece (69b) is formed, is made of a metallic sheet material while the engaging piece (69b) is formed by bending part of the metallic sheet material.

Forming the engaging piece (69b) by bending part of the metallic sheet material in such a manner simplifies the structure of the disk drive apparatus according to the present invention so that the fabrication is facilitated, enabling fabricating cost to be reduced.

9 Claims, 35 Drawing Sheets

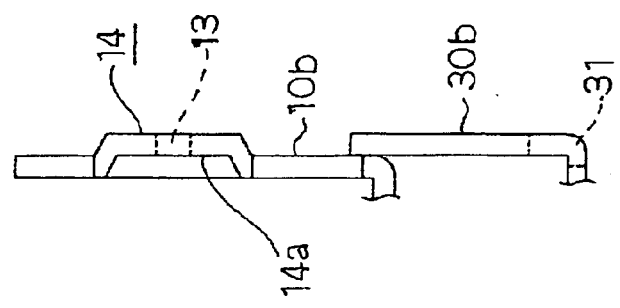
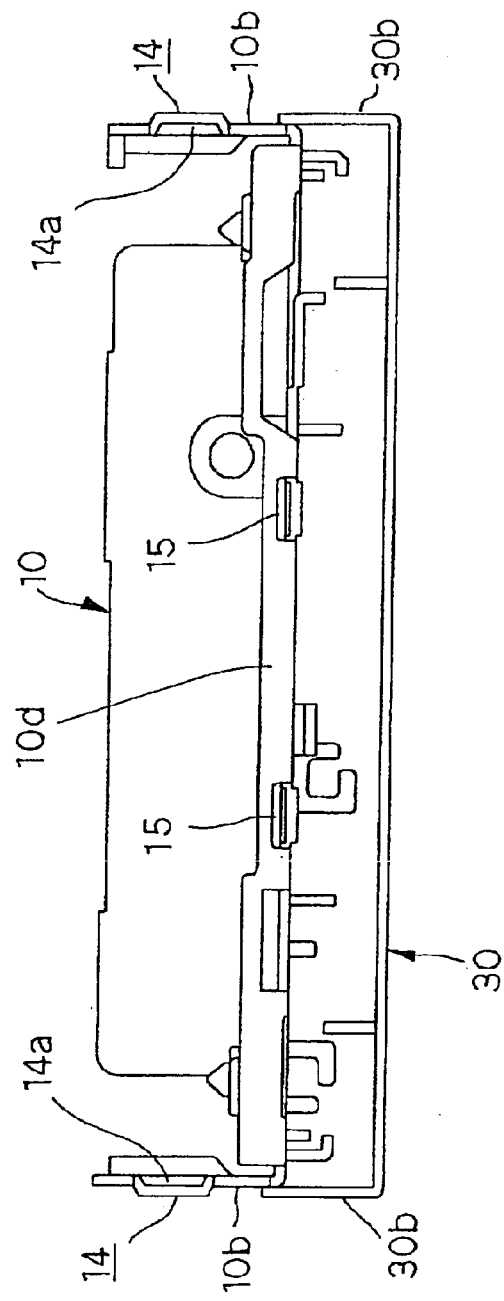

Fig.11A  Fig.11B
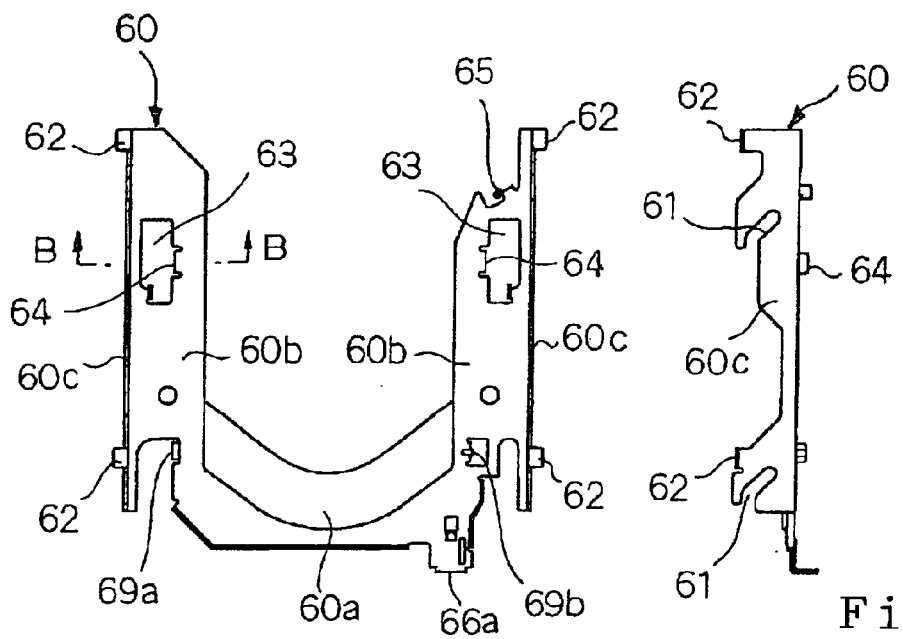
Fig.11C
Fig.11E
Fig.11D
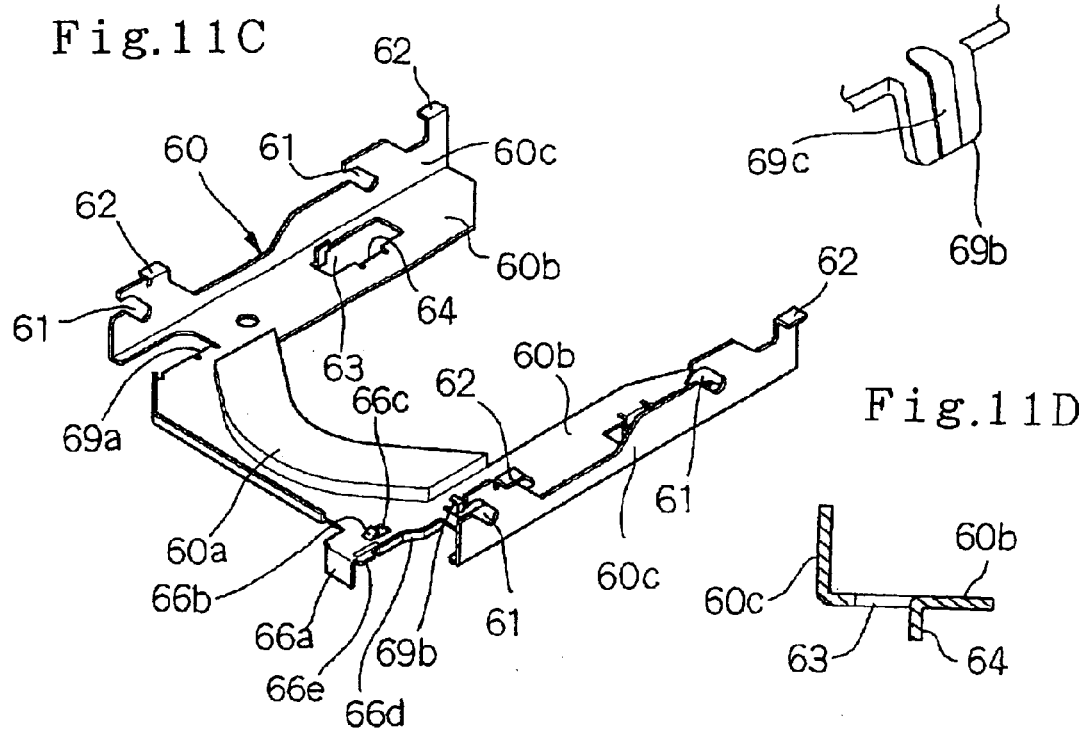

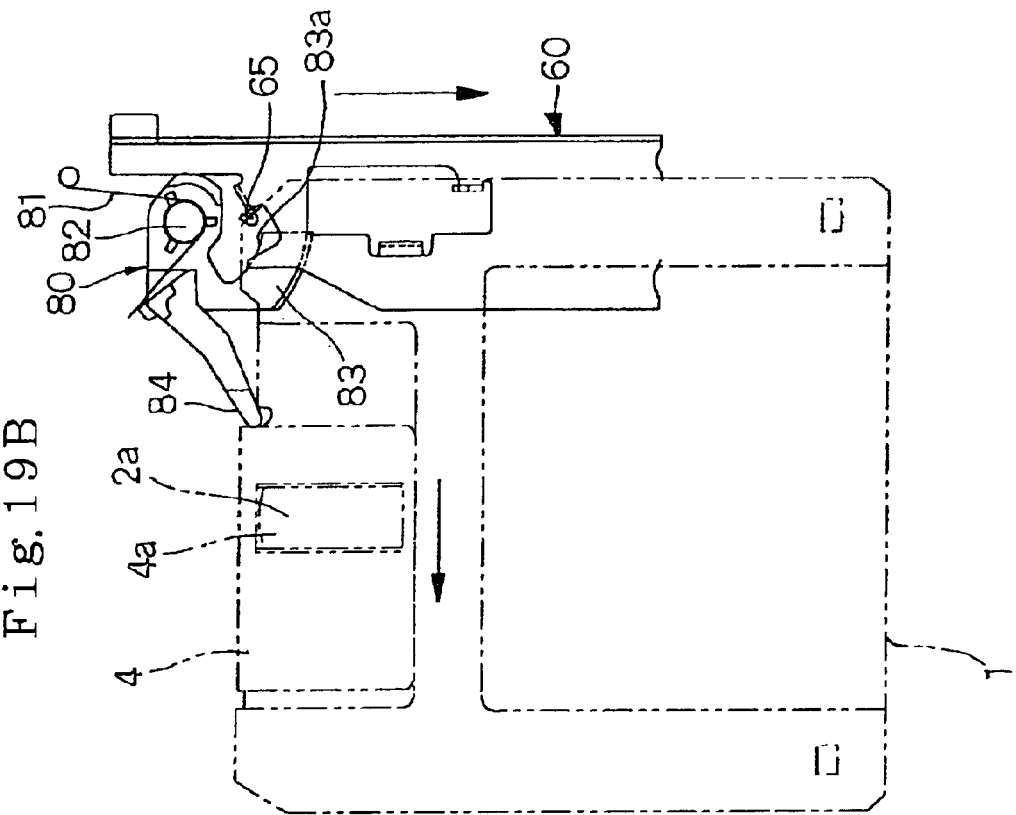
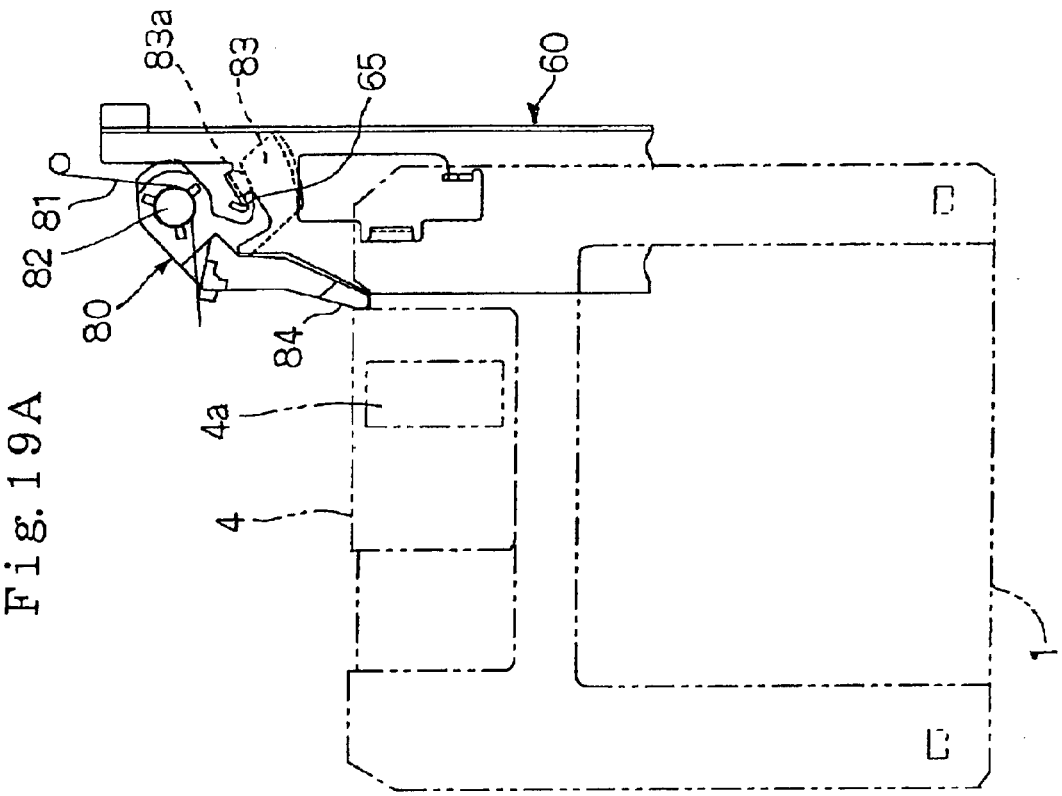

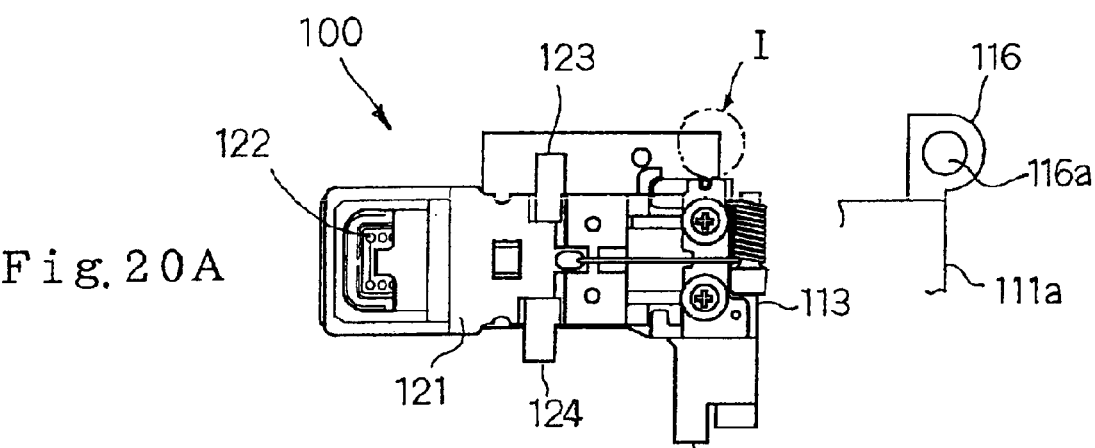
Fig.20A
Fig.20D
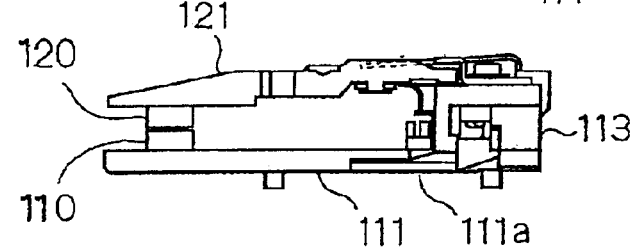
Fig.20B
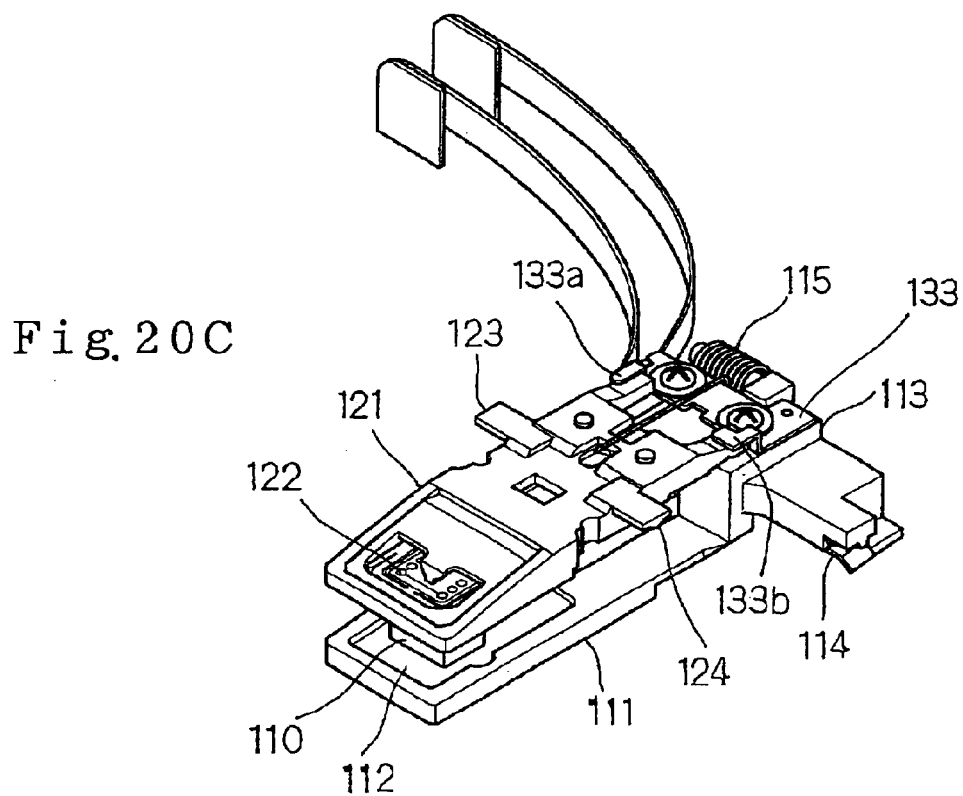
Fig.20C

Fig.32B   Fig.32A
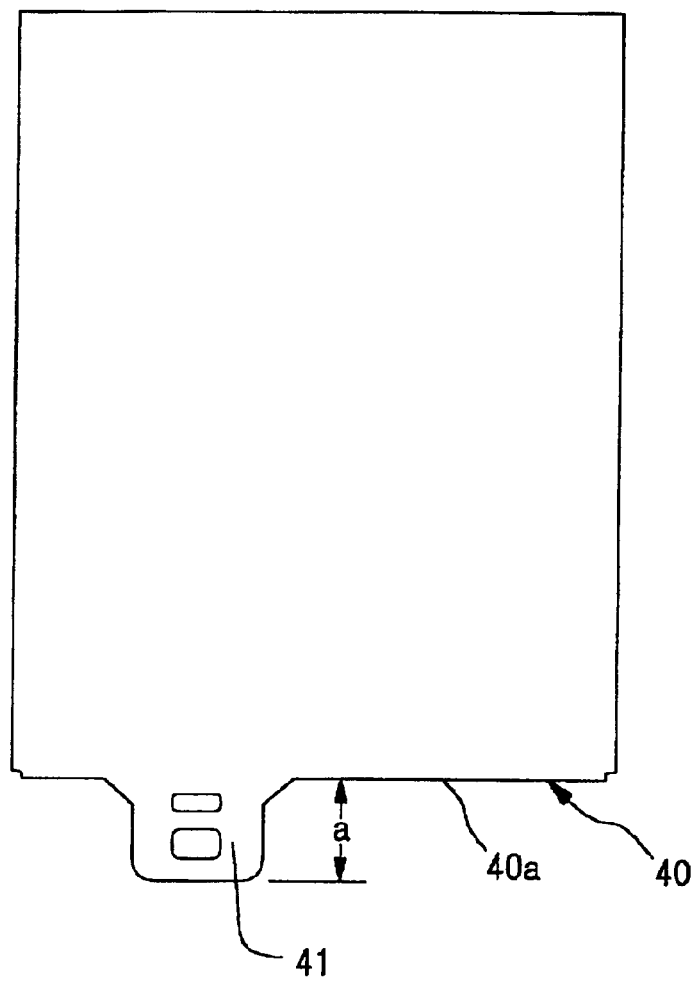
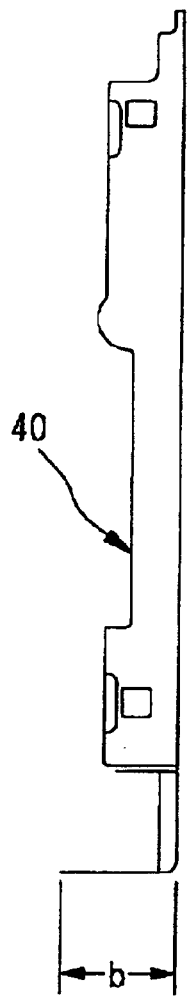
Fig.32C
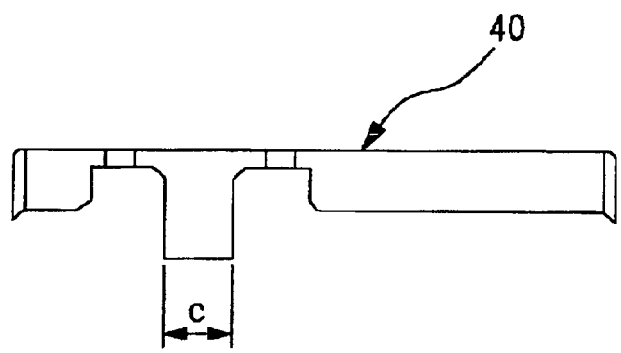

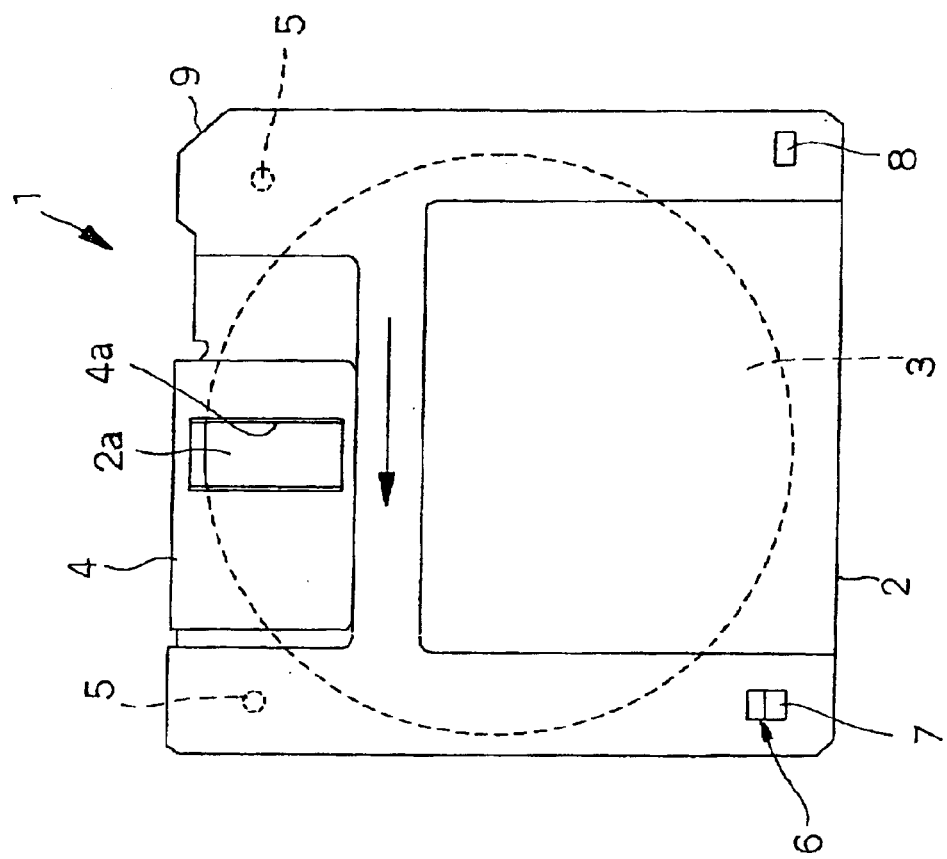
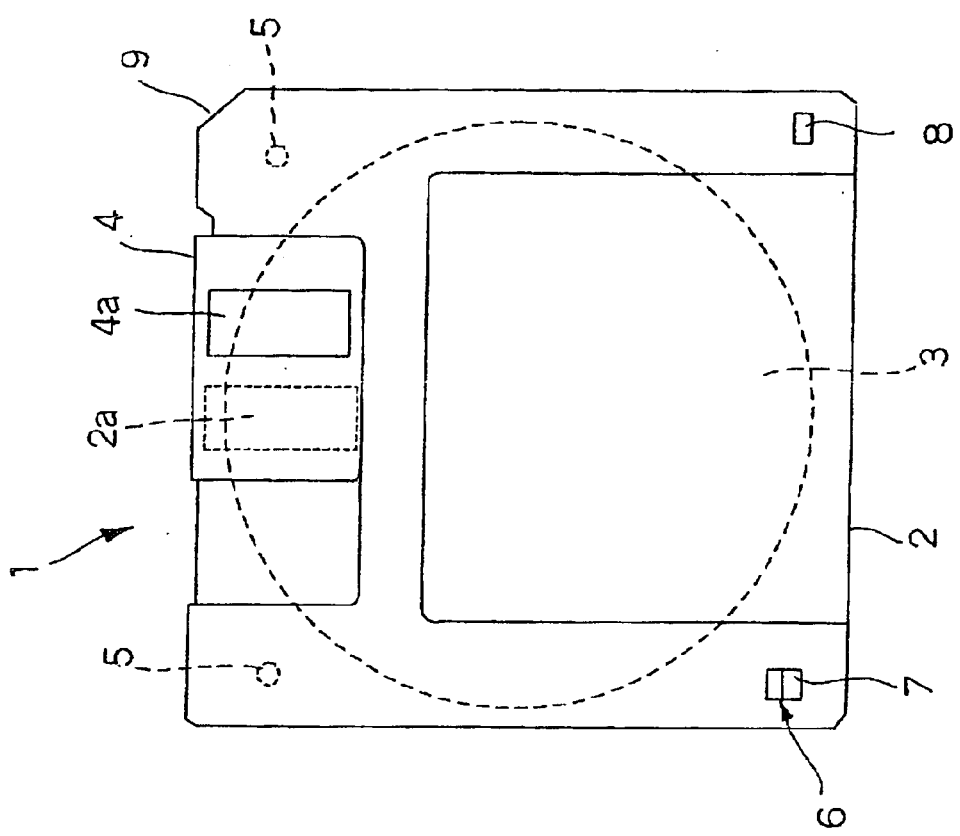

DISK DRIVE

TECHNICAL FIELD

The present invention relates to a disk drive apparatus for recording and reproducing data using a floppy disk as a recording medium.

BACKGROUND ART

In such a disk drive apparatus, a member called a slider, which is slidable in a lengthwise direction, and a member called a carrier, which holds a floppy disk therewith and moves up and down, are combined with each other so as to be mounted in a frame.

The slider is allowed to slide only in the lengthwise direction relative to the bottom surface of the frame and is restricted from vertical moving and horizontal moving other than in the sliding direction. For this purpose, between the frame and the slider, there are provided a vertical guide mechanism for restricting the vertical movement of the slider and a horizontal guide mechanism for restricting the horizontal movement of the slider other than in the sliding direction.

In conventional disk drive apparatuses, there are a type in that the slider is arranged between the frame and the carrier and another type in that the carrier is arranged between the frame and the slider. The bottom surface of the slider closely opposes the bottom surface of the frame, especially in the former.

In a structure of the disk drive apparatus, in which the bottom surface of the slider closely opposes the bottom surface of the frame, the above-mentioned vertical guide mechanism and horizontal guide mechanism are separately arranged between the bottom surface of the slider and the bottom surface of the frame.

On the bottom surface of the frame, however, there are other various elements such as a disk-driving motor and a magnetic-head-driving mechanism, which are mounted thereon at high densities. Also, since a positioning part of a floppy disk is formed by cut-up, etc., it is difficult to secure a space for separately arranging both the vertical guide mechanism and horizontal guide mechanism, so that this point has been one factor to reduce the degree of design freedom.

Moreover, when on the bottom surface of the frame, the vertical guide mechanism for restricting the vertical movement of the slider is arranged, there has been a problem of deflection produced on the bottom surface of the frame due to the load exerted on the bottom surface of the frame in the vertical direction.

Also, the disk drive apparatus using a floppy disk as a recording medium is recently at maturity as a product and the reduction of manufacturing cost is strongly demanded from the market, so that simplifying the structure to reduce fabrication cost has been an important object in the product development.

In view of the situations described above, the present invention has been made, and it is an object thereof to improve the structure of guides for restricting the movement of a slider so as to increase the degree of design freedom while reducing fabrication cost.

DISCLOSURE OF INVENTION

A disk drive apparatus according to the present invention comprises a frame (10) having a frame bottom surface and frame side walls which rise from both sides of the frame bottom surface, a slider (60) having a slider bottom surface and slider side walls which rise from both sides of the slider bottom surface, a carrier (70) which holds a disk and which is supported by the slider (60) so as to be movable in the vertical direction, and a horizontal guide mechanism and a vertical guide mechanism, which are arranged between the frame (10) and the slider (60) for slidably guiding the slider (60).

Wherein the slider (60) is slidable relative to the frame (10) in the front and rear direction. The horizontal guide mechanism is a mechanism for restricting the slider (60) so that it does not move horizontally relative to the frame bottom surface other than in the sliding direction. The vertical guide mechanism is a mechanism for restricting the slider (60) so that it does not move vertically relative to the frame bottom surface.

In a disk drive apparatus according to the present invention, the horizontal guide mechanism comprises an engaging piece (69b) disposed in at least one of the frame (10) and the slider (60), and an engaging hole (24a) which is disposed in the other and is engaged with the engaging piece (69b).

In a disk drive apparatus according to the present invention, one of the frame (10) and the slider (60) that has the engaging piece (69b) formed therein is made of a metallic sheet material while the engaging piece (69b) is made by bending a part of the metallic sheet material.

In such a manner, in a disk drive apparatus according to the present invention, the structure is simplified in forming the engaging piece (69b) by bending part of the metallic sheet material, so that the fabrication becomes easy enabling fabricating cost to be reduced.

Also, the engaging hole (24a) comprises a plurality of guide parts for restricting the movement of the engaging piece (69b) in at least two horizontal directions other than the sliding direction of the slider (60). The engaging piece (69b) is engaged with the guide parts on both surfaces of the metallic sheet material so that the movement of the engaging piece (69b) in at least two horizontal directions is restricted.

In such a manner, since the engaging piece (69b) is guided on both surfaces of the metallic sheet material with the plurality of guide parts formed in the engaging hole (24a), the horizontal guiding of the slider (60) can be achieved without rattling due to the simple structure, enabling the slider (60) to slide smoothly.

Furthermore, the engaging piece (69b) may preferably comprise an extending part (69c) in the thickness direction of the metallic sheet material for adjusting clearances to the plurality of guide part. By only forming such the extending part (69c), the rattling between the guide part of the engaging hole (24a) and the engaging piece (69b) can be further prevented in high accuracies, enabling the smooth sliding to be compensated.

The slider (60) may comprise an eject button (67) mounted thereon. To the eject button (67), a pressing force is applied according to pressing operation. The rattling of the slider (60) is mainly caused and produced by the pressing force applied to the eject button (67). Then, the engaging hole (24a) and the engaging piece (69b) having the extending part (69c) are arranged in the vicinity of the eject button (67) so that the rattling of the slider (60) can be efficiently prevented.

The engaging hole (24a) is formed on the frame bottom surface, and the engaging piece (69b) is formed on the slider bottom surface. That is, the vertical guide mechanism is arranged between the frame side wall and the slider side wall.

A disk drive apparatus according to the present invention may comprise an urging member (68) for urging the slider (60). The urging member (68) is retained with an urging-member retainer (22) formed from the frame (10) by cut-up. In association with this structure, the engaging hole (24a) may also be formed so as to continue from an opening formed in the frame (10) following as the urging-member retainer (22) is formed by cut-up.

By the structure, since the engaging hole (24a) can be formed by following as the urging-member retainer (22) is formed by cut-up, the time for independently forming the engaging hole (24a) is saved, enabling fabricating man-hour to be reduced.

In addition, "the engaging hole (24a) is formed so as to continue from an opening formed in the frame (10) when the urging-member retainer (22) is formed by cut-up" means not only forming the engaging hole (24a) by elongating or expanding the opening but also using the opening itself as the engaging hole (24a).

In a disk drive apparatus according to the present invention, the frame (10) is provided with a positioning part (17a) formed by cut-up for positioning and supporting a disk. In association with this structure, the engaging hole (18) may also be formed so as to continue from an opening formed when the positioning part (17a) is formed by cut-up. The slider (60) may also be provided with an engaging piece (64) formed to be engaged with the engaging hole (18), so that the horizontal guide mechanism can also be configured with these engaging hole (18) and engaging piece (64).

By such configurations, since the engaging hole (18) can be formed following forming the positioning part (17a) by cut-up, the time for independently forming the engaging hole (18) is saved, enabling fabricating man-hour to be reduced.

In addition, also in this case, "the engaging hole (18) is formed so as to continue from an opening formed in the frame (10) when the positioning part (17a) is formed by cut-up" means not only forming the engaging hole (18) by elongating or expanding the opening but also using the opening itself as the engaging hole (18).

The vertical guide mechanism may be preferably arranged between the frame side wall and the slider side wall. The vertical guide mechanism may be configured of a groove (16) disposed on the frame side wall and an engaging part (62) disposed on the slider side wall so as to be engaged with the groove (16).

By such a configuration, the vertical guide mechanism need not be formed on the frame bottom surface, and the structure of the frame bottom wall is thereby simplified, enabling the degree of design freedom to be increased.

That is, as described above, on the frame bottom surface, various elements such as the driving motor (303) and the magnetic-head-driving mechanism (200) are mounted at high densities, and the positioning part (17a) is formed by cut-up as well, so that the structure is generally liable to be complicated. Forming the vertical guide mechanism by keeping away from such the frame bottom surface enables the structure of the frame bottom surface to be simplified at least in comparison with a conventional disk drive apparatus.

By arranging the vertical guide mechanism on the frame side wall, the load is exerted in parallel to the surface of the frame side wall, so that there is no possibility of deflection of the frame due to the load.

Furthermore, a disk drive apparatus according to the present invention may comprise the following structures in addition to the horizontal guide mechanism of the slider (60) and the structure associated with the horizontal guide mechanism.

Front Panel

In the disk drive apparatus further comprising the driving motor (303) mounted on the bottom wall of the frame (10) for rotationally driving a disk, the frame (10) having an opening at the front end, and a front panel (50) to be fitted to the opening (63) of the frame (10) and having a disk-insertion opening for inserting the disk into the frame (10), retaining pieces (56) are formed in the both sides of the front panel (50) or in the vicinities thereof to be fitted and retained to the internal surface sides of the frame side-walls, while engaging parts (14) are formed on regions of the internal surfaces of the side-walls of the frame (10), into which the retaining pieces (56) are fitted, and further the engaging part (14) is formed outward from an internal-surface-flat region on the internal side-wall of the frame (10).

In addition, the internal-surface-flat region on the internal side-wall of the frame (10) is defined to be a raw region without unevenness due to pressing process, etc., on the internal side-wall of the frame (10).

In such a manner, only the region (engaging part (14)) of the internal surface of the side-wall of the frame (10), into which the retaining piece (56) is fitted, is extended outward from the internal-surface-flat region on the internal side-wall of the frame (10), so that the width between the engaging parts of the front panel (50) can be increased without increasing the entire width of the frame (10), thereby enabling the disk insertion to be easy by increasing the width of the disk-insertion opening.

Specifically, for example, a recess protruding outward from the internal surface may be formed on the side plate of the frame (10) and the engaging part may be formed on the internal surface of the recess. Furthermore, the recess may be formed by pressing the side-wall of the frame (10).

When the retaining pieces (56) of the front panel (50) are formed to extend in the disk-insertion direction while the both side-edges of the disk-insertion opening (51) are arranged in the vicinities of the retaining pieces (56), even when the disk is askew inserted into the disk-insertion opening (51) having the increased width, the front end-corner of the disk comes in contact with the retaining piece (56) so as to realign the track into the proper direction, enabling miss-insertion of the disk to be reduced.

Eject Button

In the disk drive apparatus further comprising an eject button (67) to be pressed with a finger when taking out the disk attached to the slider (60) from the carrier (70), a first opening (10g) and a second opening (66c) are formed at positions of the frame (10) and the slider (60) corresponding to the lower part of the eject button (67), respectively, and the eject button (67) can be taken out from the slider (60) by operating the eject button (67) from the back side of the bottom wall of the frame (10) via the first and second openings (10g) and (66c).

There may also be configured such that the eject button (67) is provided with a pressing part to be pressed with a finger formed at the front end; an engaging part (67b) to be engaged with the slider (60) formed at the rear end; the slider (60) has a retainer (66b) formed therein; the engaging part (67b) of the eject button (67) has an engaging hole (67c) formed therein to be engaged with the retainer (66b) of the slider (60); and the engaging hole (67*c*) has an engagement canceling part (67*e*) formed at rear end, so that the engagement canceling part (67*e*) formed in the engaging part (67*b*) of the eject button (67) can be operated via the first opening (10*g*) and the second opening (66*c*) respectively formed in the frame (10) and the slider (60).

Furthermore, in a disk drive apparatus further comprising a lower cover (30) disposed in the back side of the bottom wall of the frame (10) to be engaged with the frame (10), the lower cover (30) is provided with a third opening (32*a*) formed at a position corresponding to the lower side of the first opening (10*g*) and the second opening (66*c*) respectively formed in the frame (10) and the slider (60), and the eject button (67) can be also taken out from the slider (60) by operating the eject button (67) from the back side of the lower cover (30) via the first, second, and third openings.

By these configurations, the eject button (67) can be readily taken out of a sliding plate from the outside of the apparatus without removing an upper cover (40) and a carrier (70).

Circuit Board

In a disk drive apparatus further comprising a magnetic head unit (100) for recording data on and reproducing data from a disk, a head-driving mechanism (200) for driving the magnetic head unit (100), a disk-driving-motor unit (300) including a driving motor (303) for driving the disk at high speed and a motor-driving circuit for driving the driving motor (303), a main control-circuit-board (420) mounting a motor-control circuit for outputting a predetermined signal at least to the motor-driving circuit, and a control circuit of the head-driving mechanism (200), thereon, and a sensor circuit-board (410) mounting sensors for detecting required information of the disk thereon, and also comprising the main control-circuit-board (420) and the sensor circuit-board (410) mounted on the back side of the bottom wall of the frame (10), the main control-circuit-board (420) and the sensor circuit-board (410) are separately configured.

In such a manner, by separately forming the main control-circuit-board (420) and the sensor circuit-board (410), each board is miniaturized and the reduction in positioning accuracies due to processing errors and expansion and contraction of members can be suppressed, so that each board can be mounted on the frame (10) in a proper state with small strain. Moreover, the respective boards need not be mounted on the same plane, and can be mounted on the frame (10) at positions with different heights, enabling the degree of design freedom of mounting members on the frame (10) to be increased.

Also, the main control-circuit-board (420) and the sensor circuit-board (410) may be formed in respective shapes having substantially the same width and being close to rectangles with small unevenness.

In general, a parent material, from which the boards are cut-out, is provided in a rectangular shape processed in advance. Therefore, by cutting out the main control-circuit-board (420) and the sensor circuit-board (410) configured as above from the parent material in the same width so as to adjoin each other in the front and rear, the parent material waste can be reduced to the utmost, enabling material cost to be reduced.

For example, the main control-circuit-board (420) may be mounted on the back of the bottom wall of the frame (10) in the rear side while the sensor circuit-board (410) may be mounted on the back of the bottom wall of the frame (10) in the front side. Then, the main control-circuit-board (420) and the sensor circuit-board (410) can be electrically connected together with lead wire (422).

In the disk drive apparatus using a floppy disk (1) as a recording medium, it is preferable that the sensor circuit-board (410) comprise a write-protect-detecting switch (411) disposed to oppose a write-protect detector formed in at least one side-rear-edge of the floppy disk (1) for detecting whether the floppy disk (1) is write-protected or not, and a disk-type-identifying switch (412) disposed to oppose a disk-type detector formed at the other side-rear-edge of the floppy disk (1) for identifying the type of floppy disk, these mounted thereon.

Since these switches are disposed together in the vicinity of the front end of the frame (10) in accordance with the standard of the floppy disk drive apparatus, even when these switches are mounted on a single circuit board, the board shape does not become complicated and it is rather effective in improved work-efficiency because the assembly man-hour is reduced compared to a case when mounting on individual boards.

Moreover, when the sensor circuit-board (410) is configured to be fixed to the frame (10) only at one arbitrary position, internal stress is difficult to be produced by allowing the circuit board deformation to some extent even when miss-mounting, etc. In this case, it is preferable that at the front on the bottom wall of the frame (10), supporting parts (10*e* and 10*f*) be formed for supporting the sensor circuit-board (410) in a flexible state so as to protect the both end sides of the sensor circuit-board (410).

Peripheral Structure of Connectors

In a disk drive apparatus further comprising the magnetic head unit (100) for recording data on and reproducing data from a disk, the head-driving mechanism (200) for driving the magnetic head unit (100), the disk-driving-motor unit (300) including the driving motor (303) for driving the disk at high speed and the motor-driving circuit for driving the driving motor (303), the main control-circuit-board (420) mounting the motor-control circuit for outputting a predetermined signal at least to the motor-driving circuit, and the control circuit of the head-driving mechanism (200), and the lower cover (30) attached to the back side on the bottom wall of the frame (10) so as to cover the main control-circuit-board (420), and also comprising connectors arranged in the main control-circuit-board (420), restricting parts (10*i*) are arranged on the bottom wall of the frame (10) for restricting an abnormal mounting state of external connectors to be connected to the connectors.

When the connectors includes an interface connector (421*a*) for electrically connecting to external equipment, and a power supply connector (421*b*) for connecting to a power supply, it is preferable that the restricting parts (10*i*) be arranged in the vicinities of the interface connector (421*a*) and the power supply connector (421*b*) disposed on the side walls of the frame (10), respectively.

The restricting parts for restricting an abnormal mounting state of external connectors may be arranged on the side walls of the frame (10) and on the lower cover (30). Moreover, the restricting parts may be integrally formed with the side walls of the frame (10) and with the lower cover (30).

When the external connector is connected to the connector arranged in the main control-circuit-board (420), proper mounting can be achieved with the restricting part (10*i*) formed on the side wall of the frame (10). Also, since both sides of the connector arranged on main control-circuitboard (420) are restricted by restricting parts (10*i* and 30*d*) formed on the side walls of the frame (10) and on the lower cover (30), the external connector can be further securely connected to the connector arranged in the main control-circuit-board (420).

Protecting Cover for Stepping Motor

In a disk drive apparatus further comprising an upper cover (40) attached to the frame (10) so as to cover the top surface of the frame (10), the magnetic head unit (100) for recording data on and reproducing data from a disk, the head-driving mechanism (200) including a stepping motor (201) for driving the magnetic head unit (100), the main control-circuit-board (420) having the connector for electrically connecting to the outside, and a connecting member for electrically connecting between the stepping motor (201) and the main control-circuit-board (420), the apparatus is provided with a protecting cover (41) for covering the upper cover (40) and the stepping motor (201) while the upper part of the connector is exposed outside from the rear end of the upper cover (40).

The protecting cover (41) may be integrally formed with the upper cover (40). When the disk drive apparatus has the lower cover (30) mounted on the back side of the bottom wall of the frame (10) so as to cover the main control-circuit-board (420), one end of the protecting cover (41) may also be engaged with the lower cover (30).

By providing the protecting cover (41) in such a manner, there is no possibility of damaging the stepping motor (201) and the connecting member during connecting operation to the connector.

Supporting Structure of Magnetic Head

In the disk drive apparatus further comprising the magnetic head unit (100) for recording data on and reproducing data from a disk attached to the frame (10) and held by the carrier (70), the magnetic head unit (100) comprises a lower head-supporting member (111) having a lower magnetic head (110) fixed to the front end and a base (113) formed at the base end, and an upper head-supporting member (121) having an upper magnetic head (120) fixed to the front end, and in the upper head-supporting member (121), while the base end thereof is fixed to the base (113) via a leaf spring member (130), rear ends of legs extending from the base end are rotatably arranged on the base (113), and the apparatus is provided with pressing means (135 and 136) for urging the legs toward the base (113) by directly making contact with the rear ends of the legs.

By this structure, since the rear ends of the legs in the upper head-supporting member (121) are firmly pressed onto the base (113) by urging forces of the pressing means, even when vibration and impact are applied thereto from outside, there may be no possibilities of rising and displacements of the rear ends of the legs which are rotational fulcrums.

When the pressing means (135 and 136) are to be pressing spring parts formed on a part of the leaf spring member (130), the number of parts is not increased so as to be economical. Also, when the legs are configured by first and second legs (125 and 126), which respectively extend from both sides of the base end of the upper head-supporting member (121) in parallel with each other, it is preferable that each leg be urged toward the base (113) with the pressing spring part by forming the pressing spring parts on the leaf spring member (130) corresponding to the first and second legs (125 and 126).

Furthermore, when a push-up lever (123) receiving the load for pushing-up the upper head-supporting member (121) is formed at the edge of the upper head-supporting member (121) in the side that the first leg (125) exists across the central axis of the upper-head support member (121) as the boundary, there is a possibility that the rising of the first leg (125) cannot be blocked due to the torsion torque produced in the leaf spring member (130) when the push-up load is applied to the push-up lever (123). In such a case, it is preferable that the inclination of the upper magnetic head (120) due to the rising of the first leg (125) be corrected by elongating the rear end of the second leg (126), which is the other rotational fulcrum, rearward from the rear end of the first leg (125) by a required length.

The setting of the length in elongating the rear end of the second leg (126) rearward may be adjusted by appropriately repeating trial-and-error while confirming the position of the upper magnetic head (120).

BRIEF DESCRIPTION OF THE DRAWINGS

FIG. 10A is a front view of the frame and the lower cover viewed from the front end.

FIG. 10B is a partial enlarged view of FIG. 10A.

FIG. 11A is a plan view of the slider.

FIG. 11B is a side view of the slider.

FIG. 11C is a perspective view of the slider.

FIG. 11D is an enlarged sectional view at the line B—B of FIG. 11A showing the slider.

FIG. 11E is an enlarged perspective view showing an engaging piece of the slider.

FIG. 19A is a plan view of an open-and-close lever showing closing operation thereof.

FIG. 19B is a plan view of the open-and-close lever showing opening operation thereof.

FIG. 20A is a plan view of a magnetic head unit.

FIG. 20B is a side view of the magnetic head unit.

FIG. 20C is a perspective view of the magnetic head unit.

FIG. 20D is an enlarged right side-view of the region I of FIG. 20A.

FIG. 32A is a plan view of the upper cover having a protecting cover formed therein for covering a stepping motor, etc.

FIG. 32B is a plan view of the upper cover having the protecting cover formed therein for covering the stepping motor, etc.

FIG. 32C is a front view of the upper cover having the protecting cover formed therein for covering the stepping motor, etc.

FIG. 35A is a plan view of a floppy disk showing a state a shutter is closed.

FIG. 35B is a plan view of the floppy disk showing a state the shutter is open.

BEST MODE FOR CARRYING OUT THE INVENTION

Figure 1:
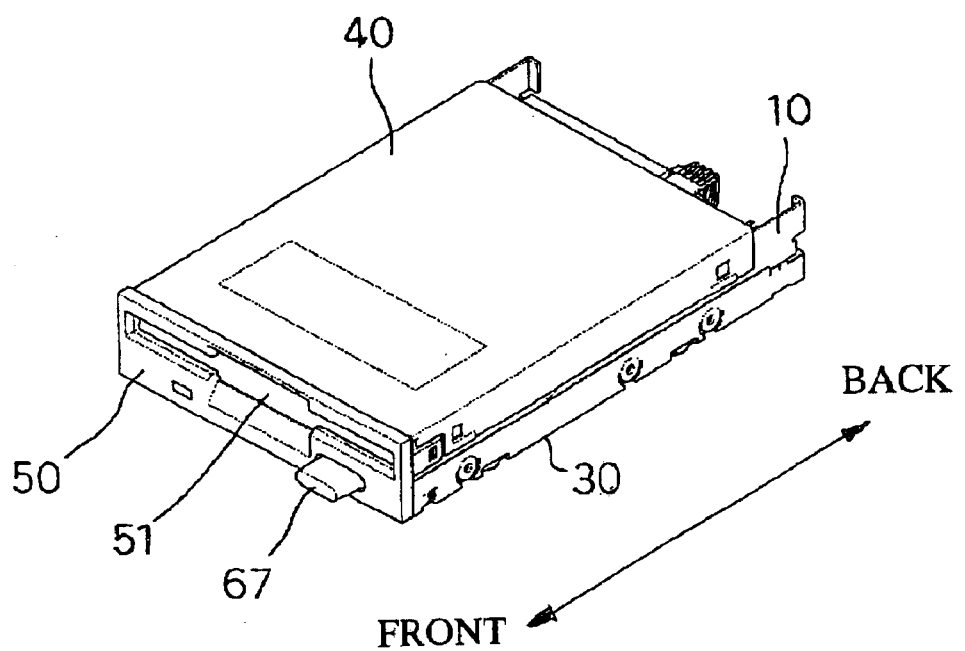
FIG. 1 is a perspective view showing an exterior of a disk drive apparatus according to an embodiment of the present invention.

A preferred embodiment according to the present invention will be described with reference to the drawings.

In the embodiments the structure is shown, in which the present invention is applied to a disk drive apparatus (FDD) using a floppy disk as a recording medium.

Summary of Recording Medium

A floppy desk 1, as shown in FIGS. 35A and 35B, comprises a case body 2, a magnetic-disk board 3, and a shutter 4, and the circular magnetic-disk board 3 is rotatably accommodated inside the case body 2. On the front top surface of the case body 2, an exposure opening is formed, and the shutter 4 is mounted in the front of the case body 2 so as to open and close the exposure opening. That is, the shutter 4 has a cut-out window 4a and is slidable in the lateral direction, and as shown in FIG. 35B, by lateral sliding (in the left), the cut-out window 4a is arranged in a position corresponding to that of the exposure opening 2a of the case body 2 so as to expose the magnetic-disk board 3. Also, the shutter 4 is urged by a spring member (not shown) in the right direction of FIG. 35A so as to close the exposure opening 2a.

In both sides on the back surface of the case body 2, positioning holes 5 are formed at front predetermined positions so as to be engaged with positioning projections 67a, which will be described later (see FIGS. 16A and 16B), and to be positioned and fixed within equipment. At one side-rear-edge of the case body 2, a write-protect detector 6 is formed. In the detector 6, a slide tab 7 is arranged, and any of write-protect and writable modes can be selected by lengthwise moving the slide tab 7. At the other side-rear-edge of the case body 2, a disk type-detector 8 for distinguishing the type (2HD or 2DD) of the floppy disk 1 is arranged. Incidentally, a hole is formed on the detector of the type 2HD floppy disk 1 while the detecting hole is not formed on the type 2DD floppy disk 1. Furthermore, a front edge corner of the case body is cut off and tapered to form a wrong-insertion protector 9. In addition, the entire structure of the floppy disk 1 described above is standardized.

Entire Structure of Apparatus

Figure 2:
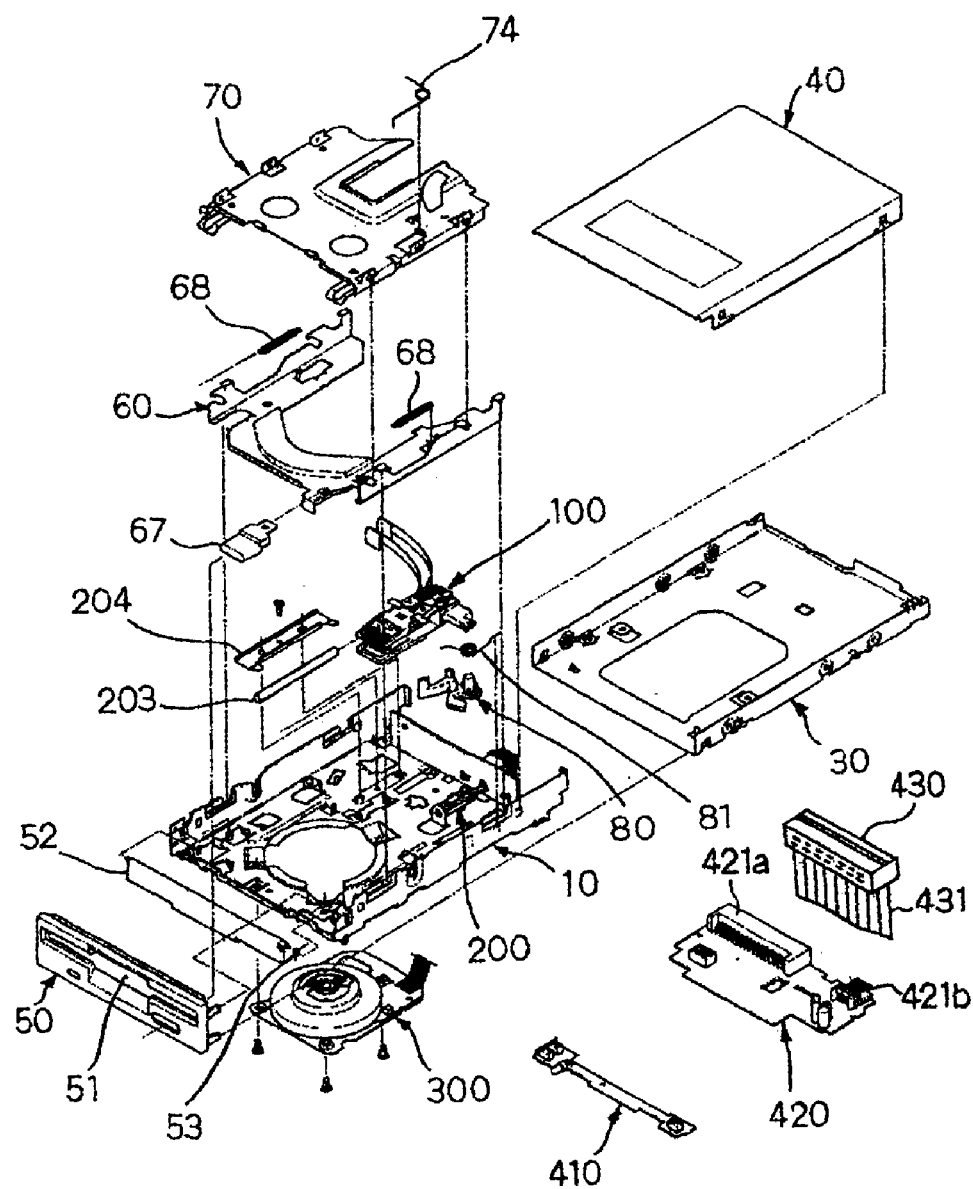
FIG. 2 is an assembly view of the disk drive apparatus according to the embodiment.

FIG. 1 is a perspective view showing the exterior of the disk drive apparatus according to the embodiment; FIG. 2 is an assembly view of the disk drive apparatus. In addition, according to the embodiment, as shown in FIG. 1, it is defined that the front is the side in which a front panel 50 is mounted and the front-and-rear direction is shown by the arrow in the drawing.

The disk drive apparatus according to the embodiment comprises a frame 10 forming a skeleton, a lower cover 30 for covering the bottom of the frame 10, and an upper cover 40 for covering the top of the frame 10, and a front panel 50 to be mounted in the front end opening of the frame 10, so as to form a casing structure shown in FIG. 1.

Moreover, in the frame 10, while a member called a slider 60 in FIG. 2 is mounted movably in the front-and-rear direction, a member called a carrier 70 is mounted movably in the vertical direction in a combined state with the slider 60.

These slider 60 and carrier 70 have functions of loading the floppy disk 1, which is inserted from a disk-insertion hole 51 formed on the front panel 50, onto a suitable position and of ejecting it from the disk-insertion hole 51.

In the frame 10, various kinds of structural elements, which are needed for magnetic recording and reproducing, such as a magnetic head unit 100, a head driving mechanism 200, a disk-drive-motor unit 300, a sensor circuit-board 410, and a main control-circuit-board 420 are assembled.

Figure 3:
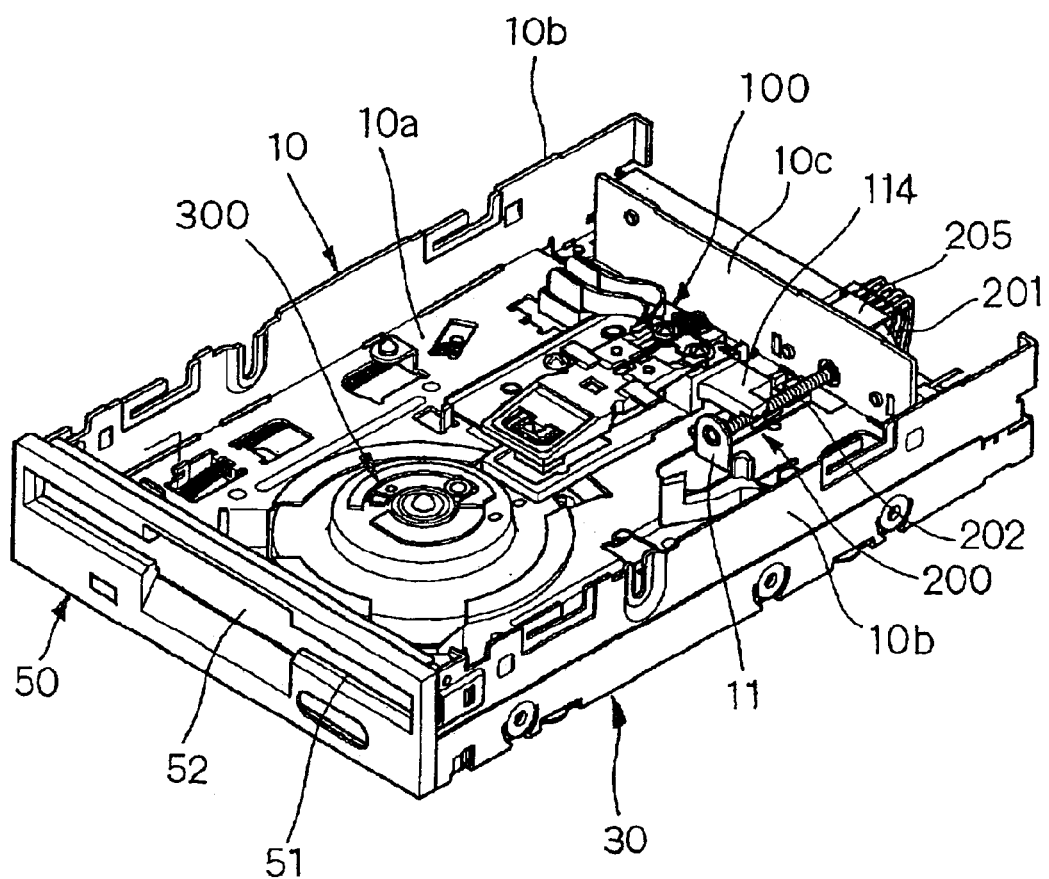
FIG. 3 is a perspective view showing a state in that various structural elements other than a slider, a carrier, and an upper cover are assembled into a frame.
Figure 4A:
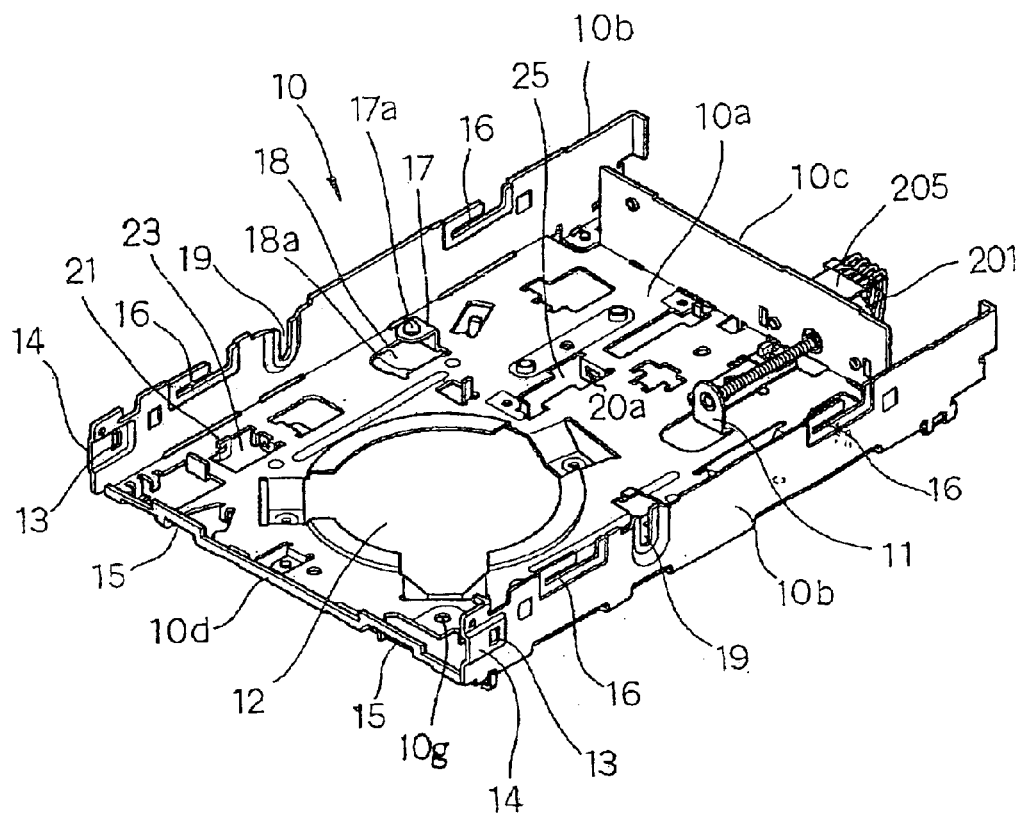
FIG. 4A is a perspective view of the frame.
Figure 4B:
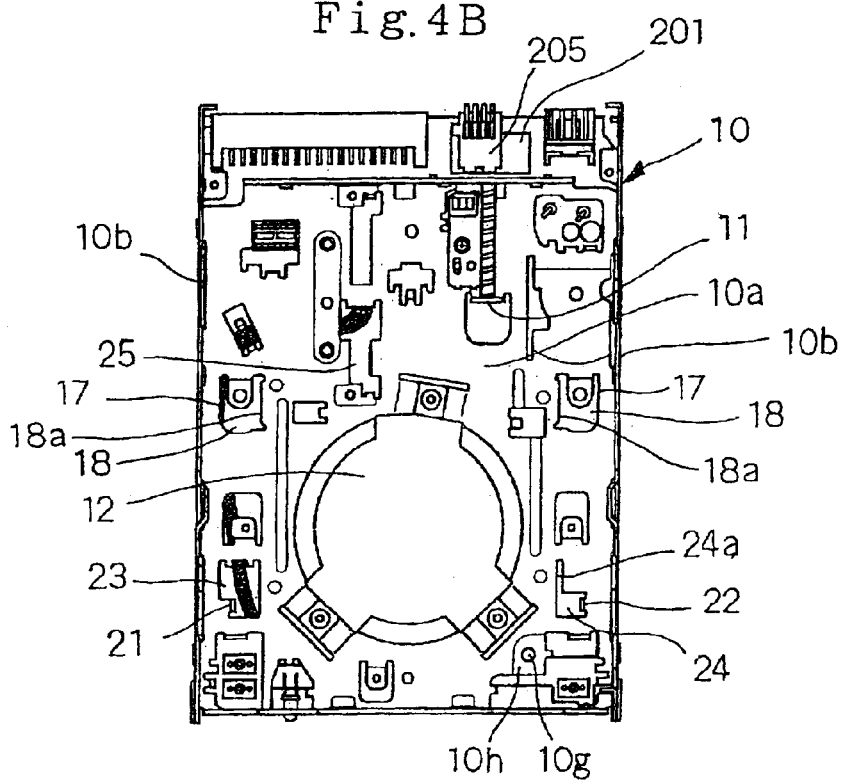
FIG. 4B is a plan view of the frame.

FIG. 3 is a perspective view showing a state of various structural elements other than the slider, the carrier, and the upper cover, which are assembled in the frame; FIGS. 4A and 4B are drawings showing the frame.

As shown in FIGS. 4A and 4B, the frame 10 is made of a metallic sheet material, and side walls 10b rise from both-side-edges of a bottom wall 10a forming the frame bottom surface, while a back board 10c rises from the rear-end edge of the bottom wall 10a. Inside the frame 10 surrounded by these parts 10a, 10b, and 10c, as shown in FIG. 3, the magnetic head unit 100 and the head driving mechanism 200 are mounted.

The head driving mechanism 200 comprises a stepping motor 201, a screw 202, and a guide rod 203 (see FIG. 2).

The stepping motor 201 is fixed on the back board 10c of the frame 10, and a rotational driving shaft of the motor 201 is the screw 202. The screw 202 is a bar member having a spiral screw thread formed on the circumferential surface thereof, and the end thereof is supported by a bearing 11 formed by rising from the bottom wall 10a of the frame 10. As shown in FIG. 3, the screw 202 is engaged with a driven part 114 extending from one side-edge of the magnetic head unit 100.

Although not shown, the guide rod 203 is fixed on the bottom wall 10a of the frame 10 via a fixing board 204 (see FIG. 2). The guide rod 203 is inserted into a through-hole 116a (see FIG. 20D) of a guided part 116 extending from the other side-edge of the magnetic head unit 100. The magnetic head unit 100 is thereby driven in the front-and-rear direction by being guided with the guide rod 203 following the rotation of the screw 202 by the stepping motor 201.

As shown in FIGS. 4A and 4B, also on the bottom wall 10a of the frame 10, a motor-mounting part 12 is formed to open, and the disk-drive-motor unit 300 is fixed to the motor-mounting part 12 with screws from the bottom surface side (see FIG. 3).

Figure 5A:
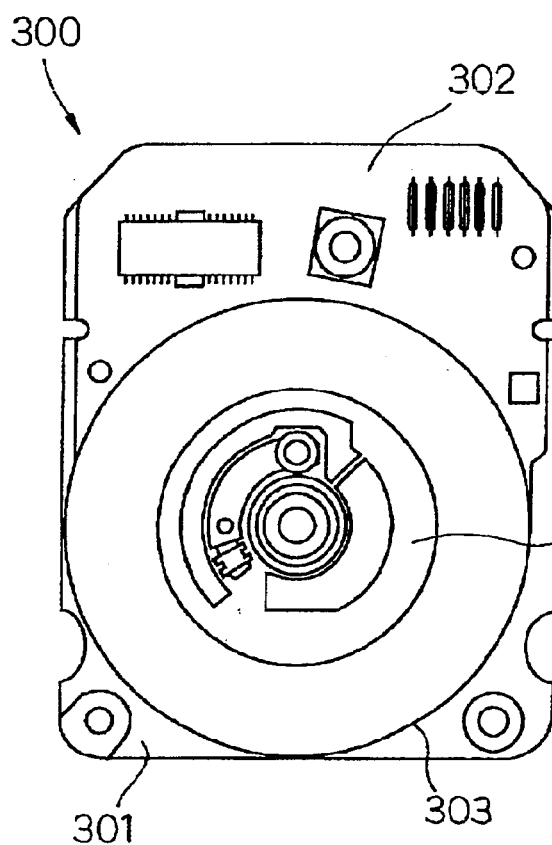
FIG. 5A is a plan view of a disk drive motor unit.
Figure 5B:
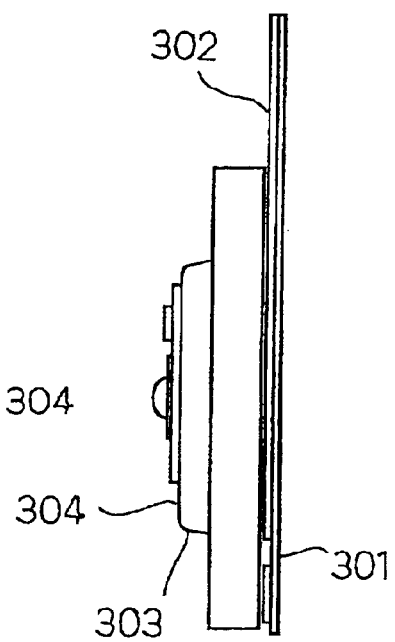
FIG. 5B is a side view of the disk drive motor unit.
Figure 5C:
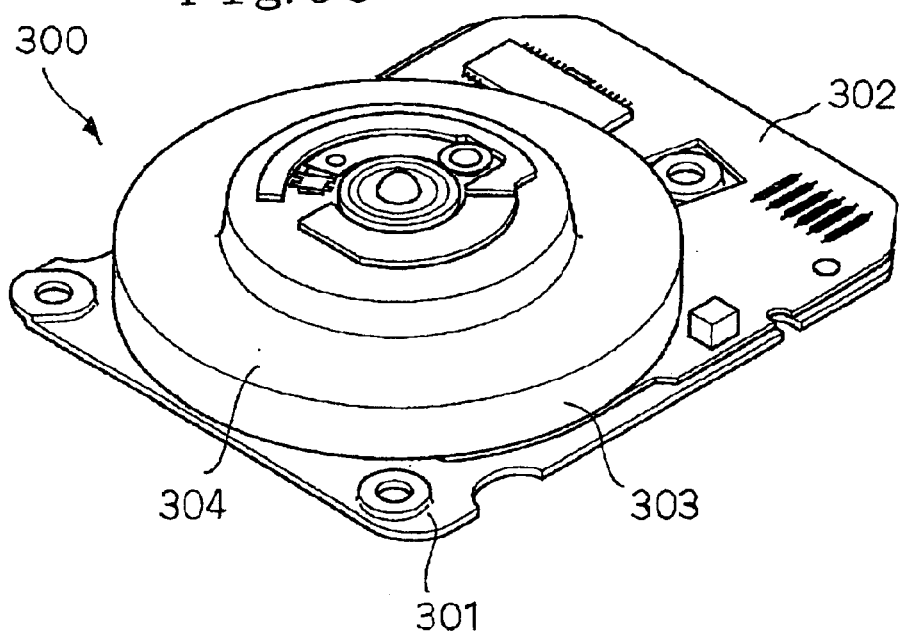
FIG. 5C is a perspective view of the disk drive motor unit.

In the disk-drive-motor unit 300, as shown in FIG. 5C, for example, a motor base-board 302 and a disk-drive motor 303 are mounted on the top surface of a metallic motor-fixing plate 301. The disk-drive motor 303 may use a general-use motor manufactured by a motor manufacturer, for example.

In the disk-drive motor 303, a turntable 304 is controlled to rotate at a high speed by a driving signal, which is input via the motor base-board 302. The turntable 304 of the disk-drive motor 303, as shown in FIG. 3, is exposed in the top-surface side from the opening formed in the motor-mounting part 12 of the frame 10.

On the bottom wall 10a of the frame 10, the sensor circuit-board 410 and the main control-circuit-board 420, these which are shown FIG. 2, are mounted in the bottom-surface side, and these circuit-board 410 and 420 are protected by covering the surroundings with the lower cover 30.

Figure 6A:
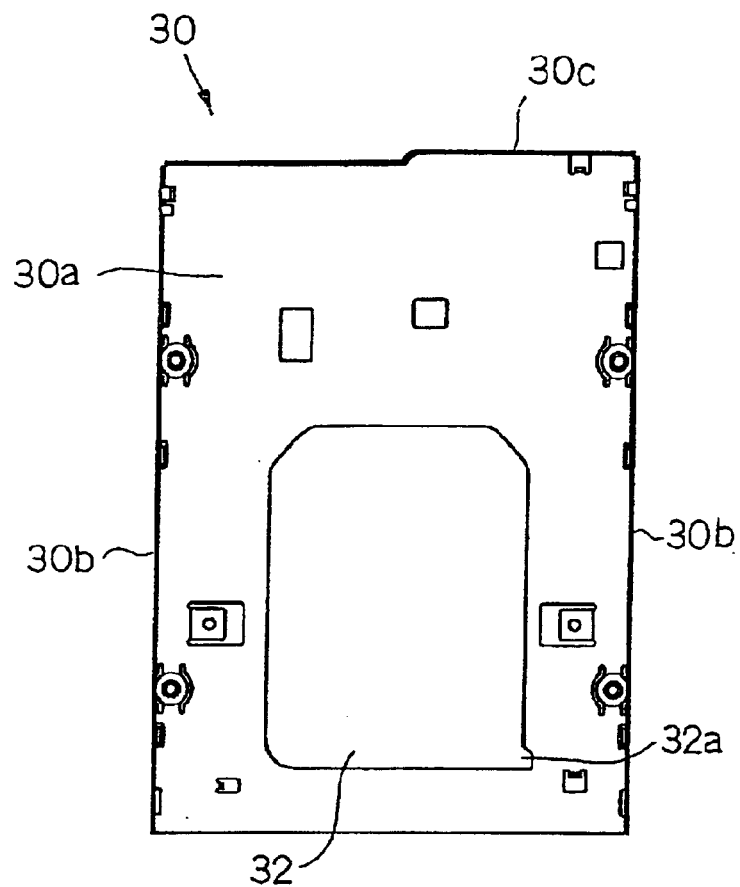
FIG. 6A is a plan view of a lower cover.
Figure 6B:
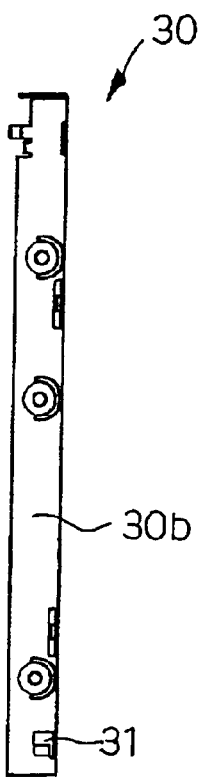
FIG. 6B is a side view of the lower cover.
Figure 6C:
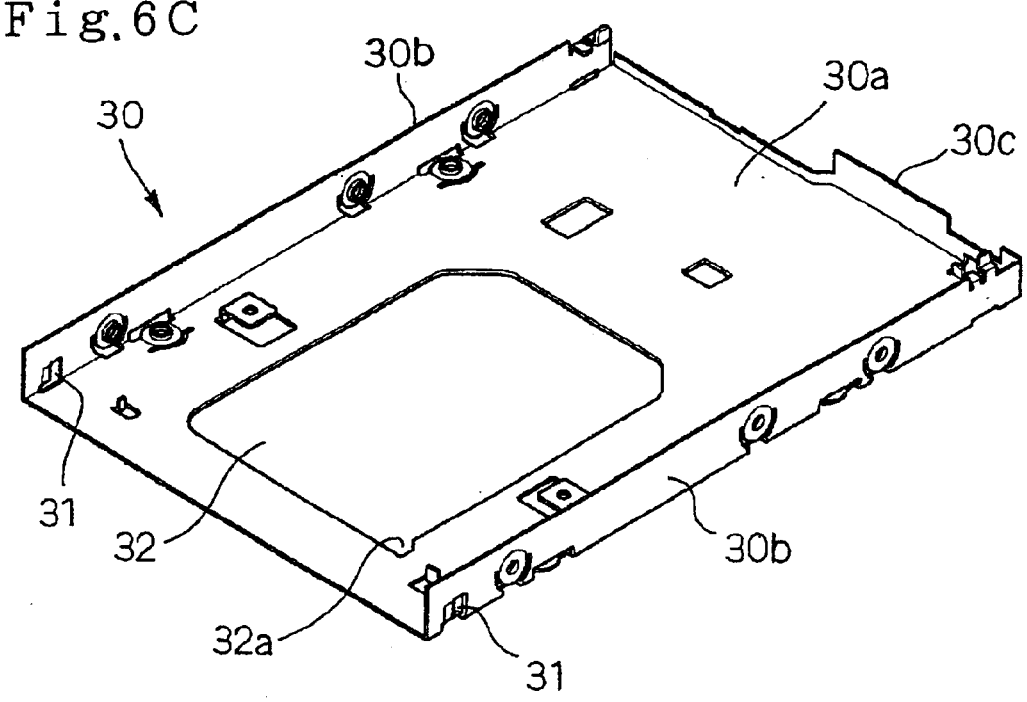
FIG. 6C is a perspective view of the lower cover.

FIGS. 6A to 6C are drawings showing the lower cover, and as shown in these drawings, the lower cover 30 comprises a bottom plate 30a, side plates 30b formed by rising from both side-edges of the bottom plate 30a, and a back plate 30c formed by rising from the rear-end edge of the bottom plate 30a.

The lower cover 30, as shown in FIG. 3, is fixed to the bottom wall 10a of the frame 10 with screws from the back side. At this time, the upper regions of the side plates 30b of the lower cover 30 are fitted to the lower regions of the side walls 10b of the frame 10 from the outsides, so that the lower cover can be mounted to the frame 10 without rattling.

The front-end part of the frame 10 and the lower cover 30 are opened, and into the opened front-end part, a shutter 52 and the front panel 50, these which are shown in FIG. 2, are fitted. The shutter 52 is rotatably mounted between the side walls 10b of the frame 10 so as to open and close the disk-insertion hole 51 formed on the front panel 50 from the back side. The shutter 52 is always urged by a torsion coil-spring 53 in the direction closing the disk-insertion hole 51 so as to prevent dust entering from the disk-insertion hole 51.

Front Panel

Figure 7A:
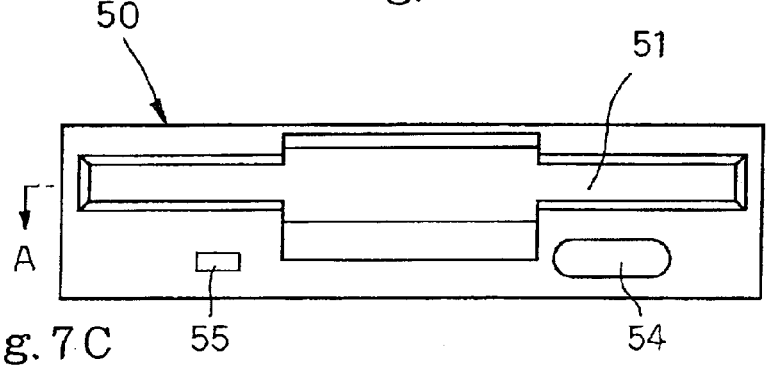
FIG. 7A is a front view of a front panel.
Figure 7D:
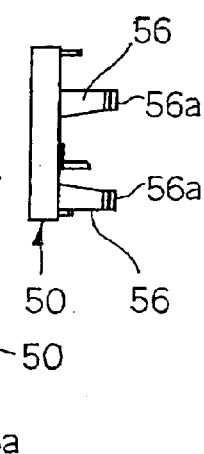
FIG. 7D is a perspective view of the front panel.
Figure 7C:
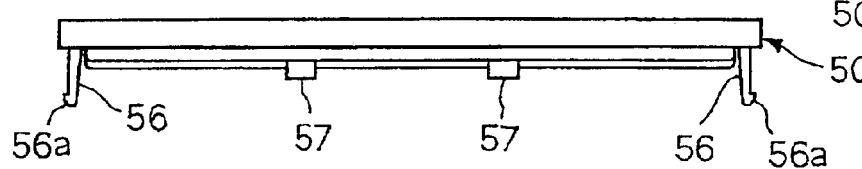
FIG. 7C is a bottom plan view of the front panel.
Figure 7B:
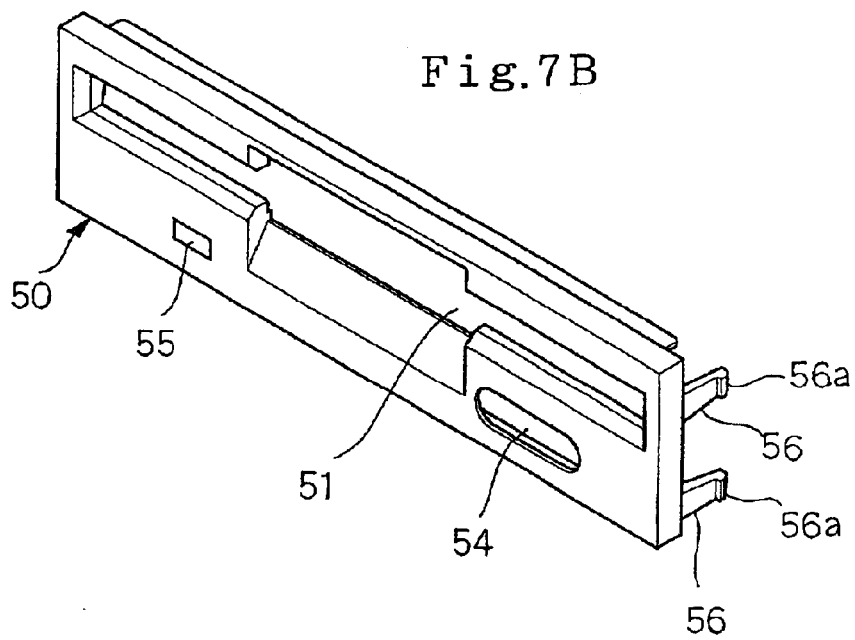
FIG. 7B is a side view of the front panel.
Figure 8:
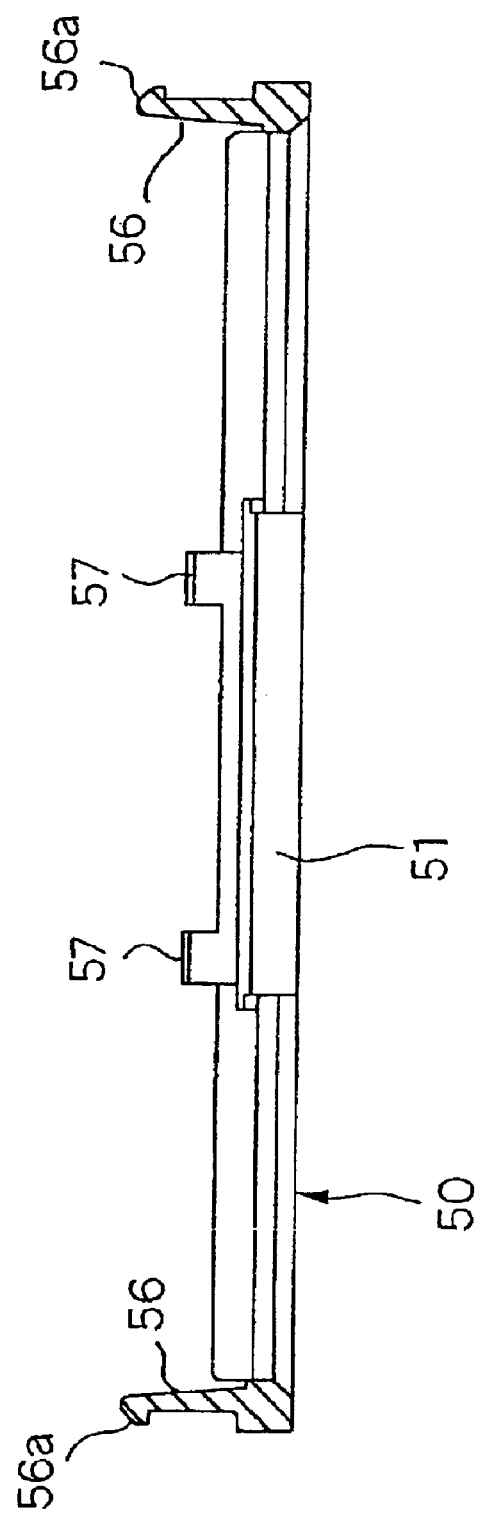
FIG. 8 is an enlarged sectional view at the line A—A of FIG. 7A.
Figure 9:
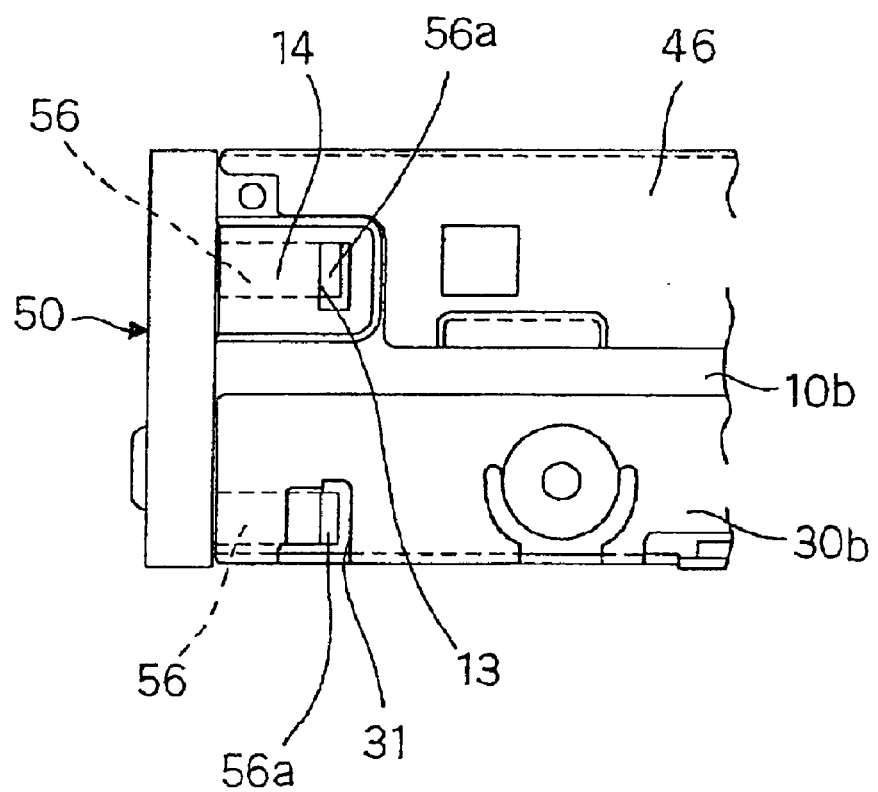
FIG. 9 is a right side-view showing a state that the front panel is mounted in the frame and at the front end of the lower cover.

FIGS. 7A to 7D are drawings showing the front panel; FIG. 7A is a front view; FIG. 7B is a right side view; FIG. 7C is a bottom plan view; and FIG. 7D is a perspective view. FIG. 8 is an enlarged sectional view at the line A—A of FIG. 7A; FIG. 9 is a right side view showing a state that the front panel is mounted in the front-end parts of the frame and the lower cover. Furthermore, FIG. 10A is a front view of the frame and the lower cover viewed from the front end side; and FIG. 10B is a partial enlarged view of FIG. 10A.

The front panel 50, as shown in FIGS. 7A and 7D, is provided with the disk-insertion hole 51 formed in the front, a slotted hole 54 for exposing an eject button 67 forward, which will be described later, and an LED-display window 55 for penetrating a light beam of an LED 414, which is arranged on the sensor circuit-board 410 (see FIG. 26A, for example).

The disk-insertion hole 51 extending laterally is needed to have an opening size as large as possible for enabling the floppy disk 1, which is an object to be inserted, to be easily inserted. At both sides' edges of the rear surface of the front panel 50, two retainer pieces 56 of upper and lower for each side are formed to rearward extend, and the tip end of the retainer piece 56 is a hook-like retainer claw 56a, which protrudes outwardly.

On the other hand, on the side walls 10b of the frame 10, engaging parts 14 are formed at portions, into which the retainer pieces 56 are to be fitted. The engaging part 14, as shown in FIG. 10B, is formed by pushing the side wall 10b outwardly from the internal surface side, so that the internal surface 14a of the engaging part 14 is positioned outside from the surrounding internal surface. Moreover, the engaging part 14 is provided with an engaging hole 13 for retaining the retainer claw 56a formed therein.

The upper retainer pieces 56 formed in the front panel 50 are fitted along the internal surface portions of the engaging parts 14, which are pushed outside so that the retainer claw 56a formed at the tip end thereof is engaged with the engaging hole 13. The internal surface 14a of the engaging part 14, which is to be fitted with the retainer piece 56, is outwardly extended on the side wall 10b of the frame 10 in such a manner, so that the width between the retainer pieces 56 of the front panel 50 can also be increased.

Since these retainer pieces 56, as shown in FIG. 8, are formed in both sides of the disk-insertion hole 51, when the width between the retainer pieces 56 is increased, the lateral width of the disk-insertion hole 51 can also be increased. As a result, the opening size of the disk-insertion hole 51 is increased, enabling the floppy disk 1, which is an object to be inserted, to be easily inserted.

In addition, the upper retainer pieces 56 formed in the front panel 50 are retained with engaging holes 31 formed on the side plates 30b of the lower cover 30 (see FIG. 9).

When the lateral width of the disk-insertion hole 51 is increased, the floppy disk 1 may be inserted into the disk-insertion hole 51 in a bilaterally inclined position as it is. Then, according to the embodiment, the apparatus is so configured that the retainer pieces 56, as shown in FIG. 8, are formed in both sides of the disk-insertion hole 51, and when the floppy disk 1 is inserted into the disk-insertion hole 51 in a bilaterally inclined position, the disk 1 thereby comes in contact with the internal surfaces of the retainer pieces 56 so as to be guided in a proper insertion direction. That is, the retainer pieces 56 have a function of guiding the floppy disk 1 to be inserted into the disk-insertion hole 51.

Also, as shown in FIGS. 4A and 10A, the front end of the bottom wall 10a of the frame 10 is slightly bent upwardly, and a bent part 10d is provided with two positioning holes 15 formed therein. The back surface of the front panel 50 is provided with two positioning projections 57 formed therein, which are fitted into the positioning holes 15 formed in the frame 10, so that while preventing the frame 10 from rattling, when an excessive external force is exerted on the front panel 50, the positioning projections 57 ward off the external force so as to protect the retainer pieces 56.

Slider and Carrier

Figure 12A:
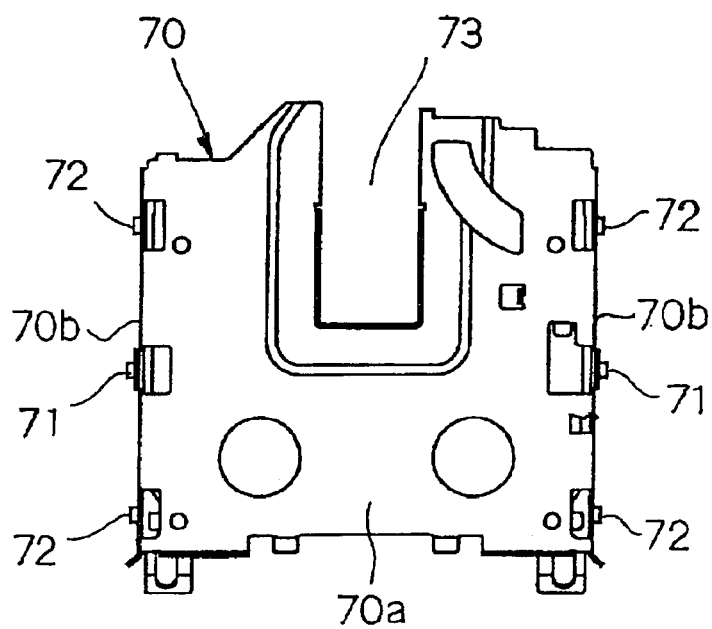
FIG. 12A is a plan view of the carrier.
Figure 12B:
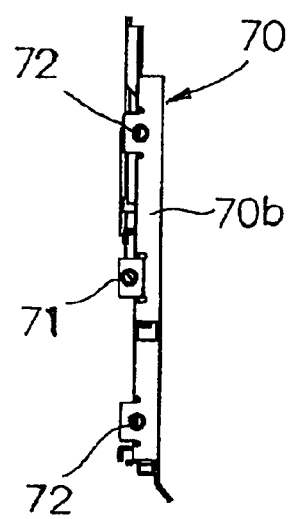
FIG. 12B is a side view of the carrier.
Figure 12C:
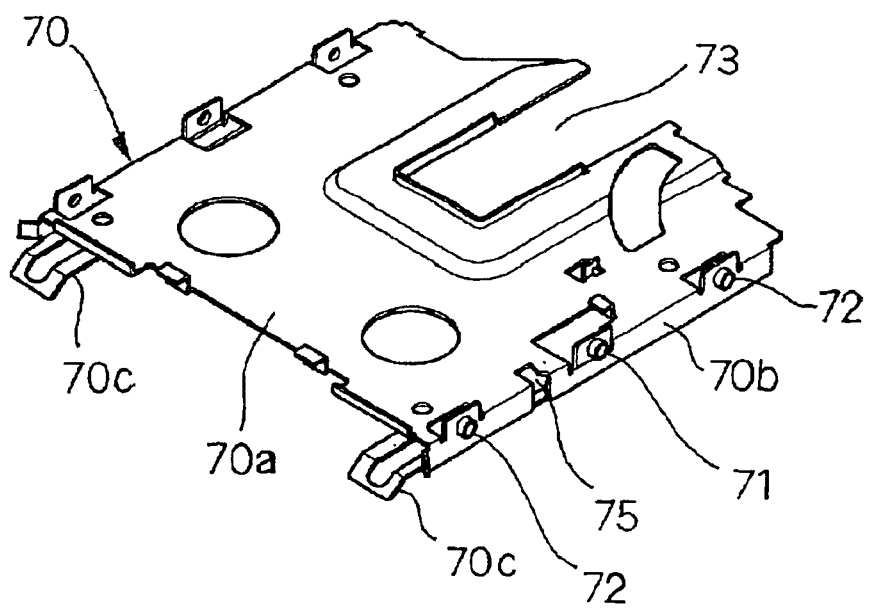
FIG. 12C is a perspective view of the carrier.
Figure 13:
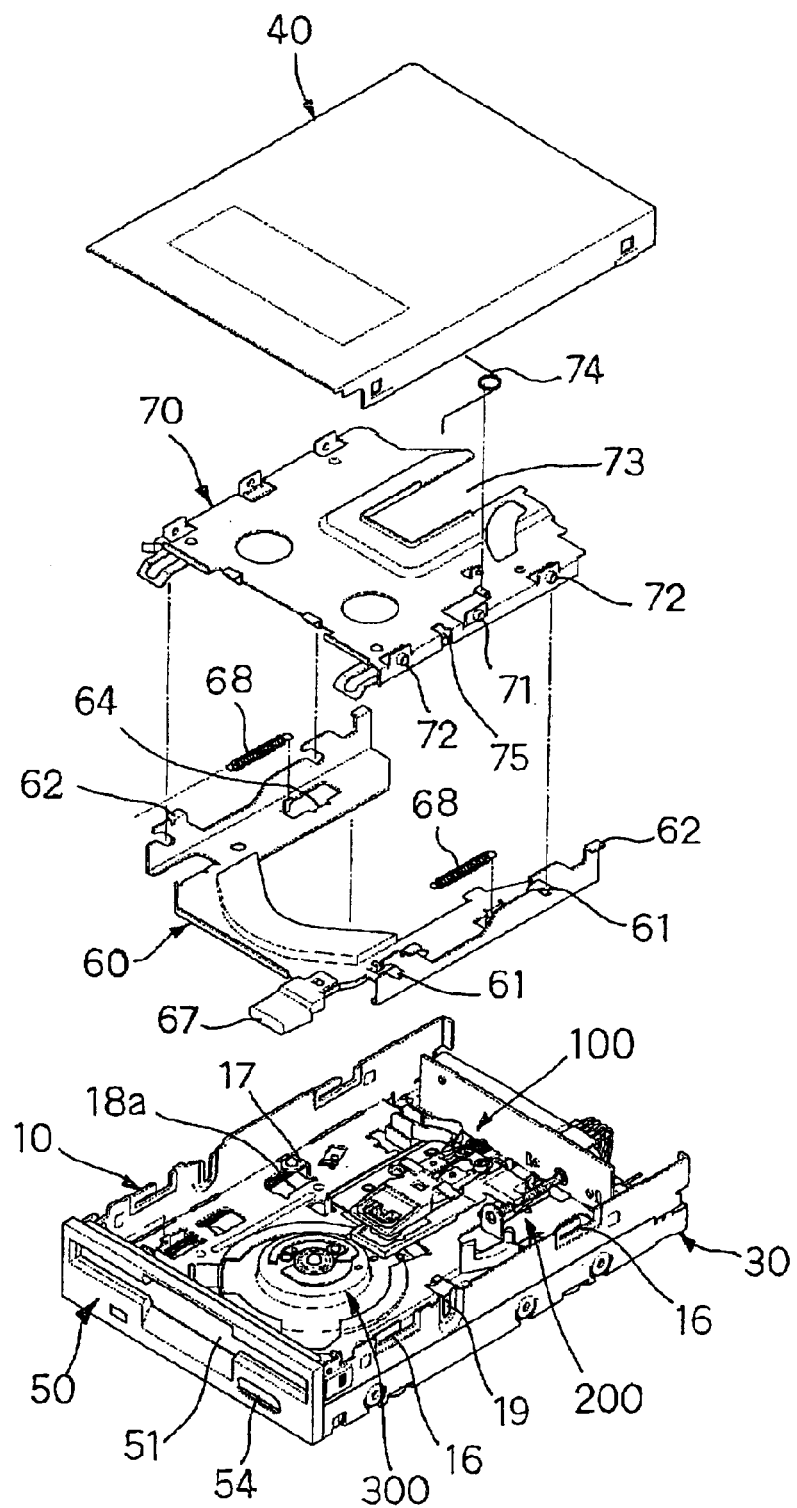
FIG. 13 is an assembly view of the frame showing a state before the slider and the carrier are mounted therein.
Figure 14:
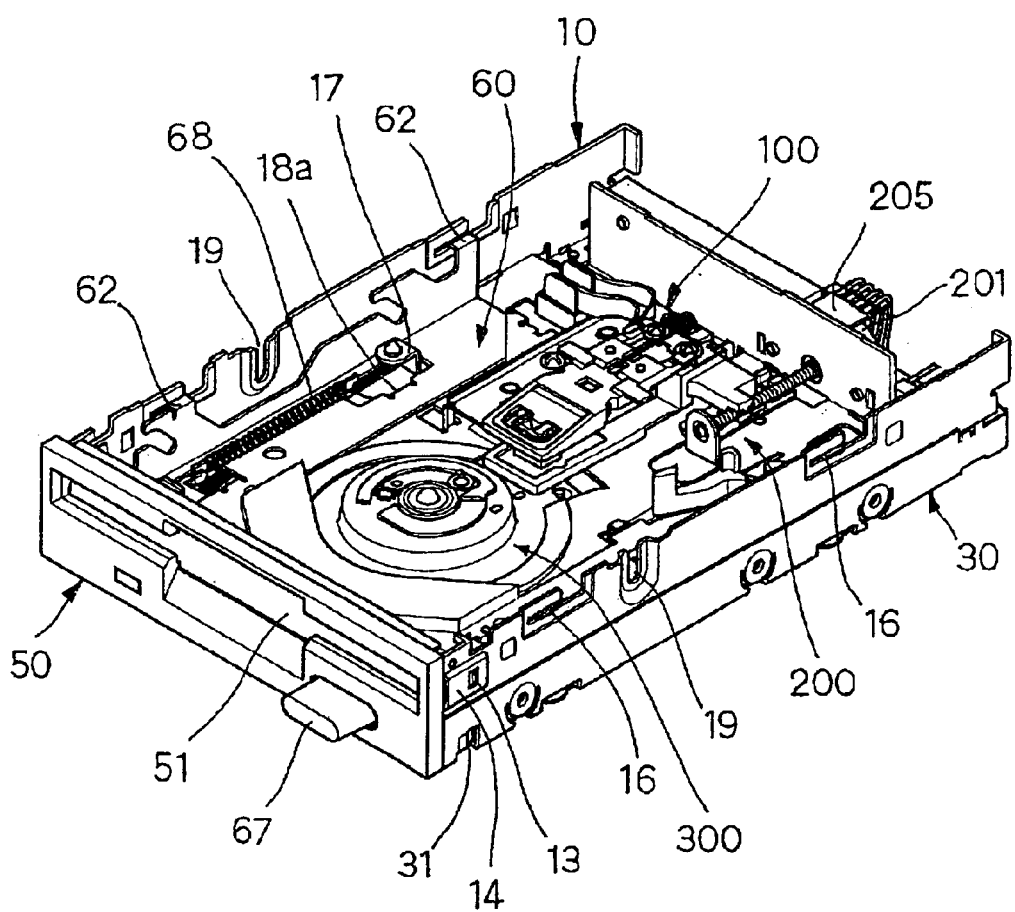
FIG. 14 is a perspective view of the frame showing a state after the slider is mounted therein.
Figure 15:
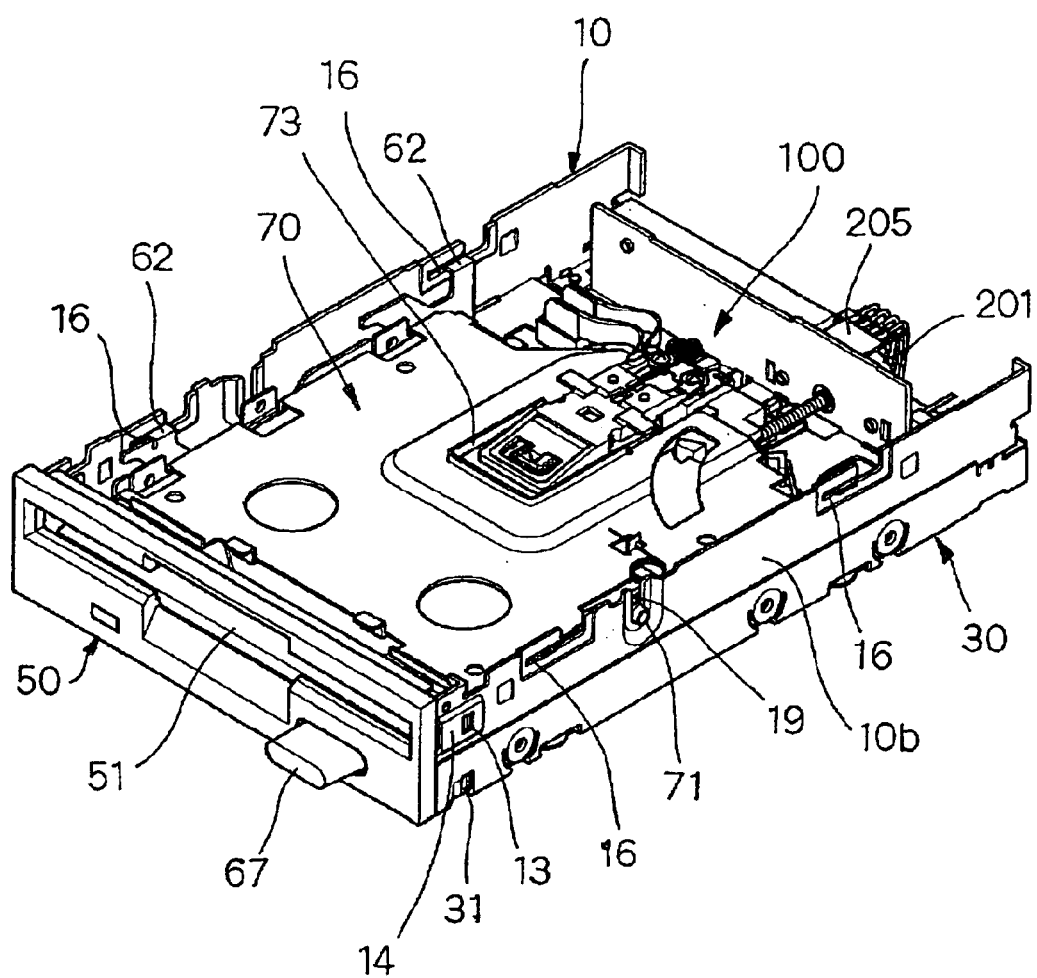
FIG. 15 is a perspective view of the frame showing a state after the carrier is mounted therein.

FIGS. 11A to 11E are drawings showing the slider; FIGS. 12A to 12C are drawings showing the carrier. FIG. 13 is an assembly view showing a state of the slider and the carrier before they are mounted in the frame; FIG. 14 is a perspective view showing a state that the slider is mounted in the frame; and FIG. 15 is a perspective view showing a state that the carrier is further mounted in the frame.

The slider 60 is made of a metallic sheet material, and as shown in FIGS. 11A to 11C, each of bottom plates 60b extends rearward from both sides of a front plate 60a, so that a U-shaped slider bottom surface in a plan view is formed. The outside edge of each of the bottom plates 60b is upwardly bent to form each of side plates 60c. The side plates 60c form slider side walls.

Each side plate 60c is provided with an inclined guide groove 61 for moving up-and-down formed to extend obliquely downward and rearward from the top-end edge.

In the vicinities of the front and rear ends of the top edge of the side plate 60c, engaging pieces 62, which are structural elements of a vertical guide mechanism, are formed to extend sideways, respectively. Furthermore, in a part of the bottom plate 60b of the slider 60, an opening 63 is formed, and the edge of the opening 63 is downwardly bent to form an engaging piece 64, which is a structural element of a horizontal guide mechanism (see FIG. 11D).

The opening 63 is a get-away hole for avoiding the interference with a support piece 17 formed from the bottom wall 10a of the frame 10 by cut-up, which will be described later, and is formed in correspondence to the support piece 17. According to the embodiment, the engaging piece 64 is formed by using part of the portion that is cut out from the slider 60 when forming the opening 63, enabling the structure of the slider 60 to be simplified.

Furthermore, the rear end portion of one side plate 60c is downwardly bent to form an engaging projection 65 for engaging with a cam surface 83a of an open-and-close lever 80, which will be described later.

On the other hand, in the side walls 10b of the frame 10, as shown in FIGS. 4A and 14, support grooves 16 extending in the front and rear direction are formed. The slider 60 of the structure described above is mounted on the bottom wall 10a of the frame 10 movably in the front and rear direction in a state that the engaging pieces 62 are engaged with the support grooves 16. The support grooves 16 form the vertical guide mechanism together with the engaging pieces 62 of the slider 60. That is, by the engagement of the engaging pieces 62 with the support grooves 16, the vertical movement of the slider 60 is restricted while the coming-off of the slider 60 from the frame 10 is prevented.

In such a manner, the vertical guide mechanism is configured of the engaging pieces 62 formed on the side plates 60c of the slider 60 and the support grooves 16 formed on the side walls 10b of the frame 10, so that it is not necessary to form the vertical guide mechanism on the bottom wall 10a of the frame, enabling the degree of design freedom to be increased.

Figure 16A:
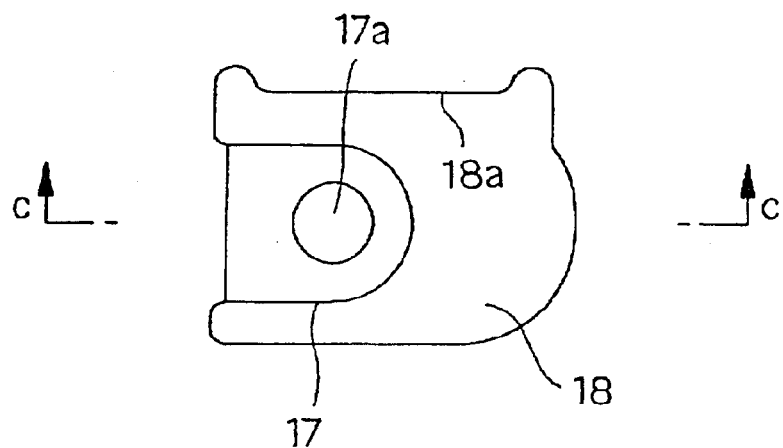
FIG. 16A is a plan view of a supporting piece for supporting a floppy disk from the lower part showing the formative portion thereof.

On the bottom wall 10a of the frame 10, the support pieces 17 for supporting the floppy disk 1 from the lower part are formed at predetermined positions. The support piece 17, as shown in an enlarged view of FIG. 16A, is formed from the bottom wall 10a of the frame 10 by cut-up so as to have an L-shaped section, and on the top surface thereof, a projection 67a (a positioning part) for positioning the floppy disk 1 is formed.

Then, when the support piece 17 is formed from the bottom wall 10a of the frame 10 by cut-up in such a manner, on the bottom wall 10a of the frame 10, an opening is formed.

Figure 16B:
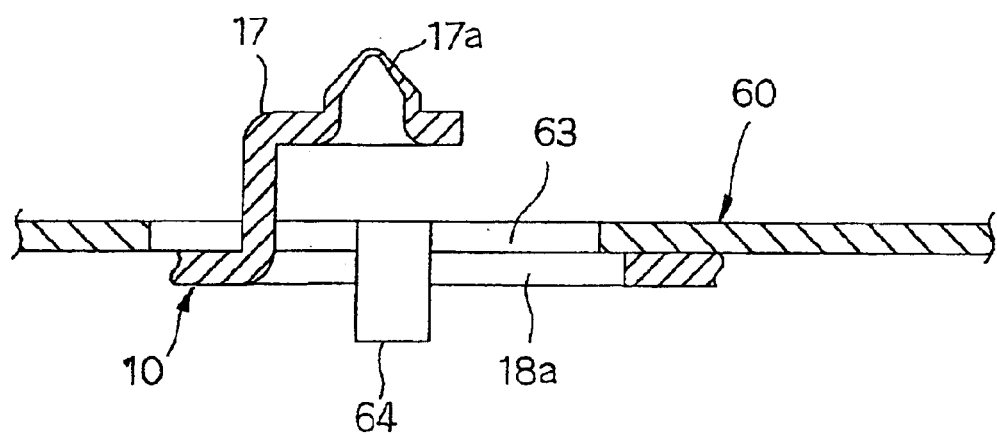
FIG. 16B is a longitudinal sectional view of the supporting piece for supporting a floppy disk from the lower part showing the formative portion thereof.

According to the embodiment, this opening is used as an engaging hole 18 that is a structural element of the horizontal guide mechanism. That is, one side edge 18a of the engaging hole 18 is formed to linearly extend in the front and rear direction, so that the engaging piece 64 formed in the slider 60 is engaged with the side edge 18a of the engaging hole 18, as shown in FIG. 16B. The slider 60 is thereby restricted so that it does not move horizontally relative to the bottom wall 10a of the frame 10 other than the sliding direction.

In such a manner, the opening formed in association with the support piece 17 is used as the engaging hole 18 that is a structural element of the horizontal guide mechanism, so that this kind engaging hole need not be particularly formed, resulting in a simplified structure of the frame 10 which is easy to be fabricated.

A coil spring 68 as an urging member, as shown in FIG. 14, is stretched between the slider 60 and the frame 10 so that the slider 60 is normally urged in the front direction due to a spring force of the coil spring 68.

On the bottom wall 10a of the frame 10, retainers 21 and 22 (retainers for an urging member) for retaining one end of the coil spring 68 are formed by cut-up (see FIGS. 4A and 4B), and in association with the cut-up of the retainers 21 and 22, openings are formed on the bottom wall 10a, respectively.

According to the embodiment, these openings are used as engaging holes 23 and 24 that are structural elements of the horizontal guide mechanism. That is, the slider 60, as shown in FIGS. 11A and 11C, is provided with engaging pieces 69a and 69b formed by the downward bending together with the engaging piece 64, and the engaging pieces 69a and 69b are engaged with the corresponding side edges of the engaging holes 23 and 24, respectively. The slider 60 is thereby restricted so that it does not move horizontally relative to the bottom wall 10a of the frame 10 other than the sliding direction.

Part of the engaging hole 24, which is one of the engaging holes, is formed to be a slit-like slotted groove 24a continuously rearward extending from an opening formed on the bottom wall 10a in association with the cut-up of the retainer 22 (see FIG. 4B).

Furthermore, on the peripheral wall of the engaging piece 69b to be engaged with the slotted groove 24a, as shown in an enlarged view of FIG. 11E, an extending part 69c is formed by a half-blanking process. Due to the extending part 69c, the engaging piece 69b has a shape having a bulge in the thickness direction. The extending part 69c has a function of adjusting the clearance between the slotted groove 24a and the engaging piece 69b.

That is, adjusting the clearance between the slotted groove 24a and the engaging piece 69b with the extending part 69c enables the slider 60 to be guided between both surfaces of the engaging piece 69b and both side edges of the slotted groove 24a, resulting in the horizontal guide mechanism with extremely small rattling.

In addition, the both side edges of the slotted groove 24a form plural guiding sections for the engaging piece 69b to restrict the movement of the slider 60 in at least two horizontal directions other than the sliding direction.

The horizontal guide mechanism formed of the above-mentioned slotted groove 24a and the engaging piece 69b having the extending part 69c is arranged in the vicinity of the eject button 67, which will be described later.

That is, to the eject button 67, a pressing force is applied in association with the pressing operation. The rattling of the slider 60 is mainly produced due to the pressing force applied to the eject button 67. Then, arranging the slotted groove 24a and the engaging piece 69b having the extending part 69c in the vicinity of the eject button 67 enables the rattling of the slider 60 to be efficiently prevented.

As shown in FIGS. 12A to 12C, the carrier 70 comprises a top plate 70a and side plates 70b, which extend downwardly from both side edges of the top plate 70a, respectively. Lower edges of the both side plates 70b are internally bent to form lower edges 70c, which have a function of simultaneously holding side edges of the floppy disk 1 inserted into the lower side of the top plate 70a from the front.

Each side plate 70b of the carrier 70 has an engaging projection 71 for moving up-and-down and an engaging projection 72 for obliquely relatively moving, which are respectively formed to protrude sideways. On the top plate 70a of the carrier 70, a cut-out 73 is further formed for avoiding the interference with the magnetic head unit 100, as shown in FIG. 15.

On the other hand, each of the side walls 10b of the frame 10, as shown in FIG. 15, has a vertical guide groove 19, which extends vertically. The carrier 70 described above is mounted within the frame 10 in a state that the engaging projections 71 for moving up-and-down are engaged with the vertical guide grooves 19 while the engaging projections 72 for obliquely relatively moving are engaged with the inclined guide grooves 61 (see FIGS. 11B and 11C).

As described above, the relative movement in the obliquely vertical direction between the slider 60 and the carrier 70 mounted within the frame 10 can be performed along the inclined guide grooves 61. However, since the engaging pieces 62 of the slider 60 are engaged with the support grooves 16 of the frame 10 while the engaging projections 71 of the carrier 70 are engaged with the vertical guide grooves 19 of the frame 10, the relative movement in the obliquely vertical direction is decomposed into the front-and-rear movement of the slider 60 and the vertical movement of the carrier 70.

In addition, the carrier 70 is provided with a torsion coil spring 74 mounted thereto and shown in FIG. 13, and the end portion of the torsion coil spring 74 enters within an insertion track for the floppy desk 1 from a cut-out hole 75 (see FIG. 12C) formed in the carrier 70. When the floppy desk 1 is inserted thereinto in a normal position, the wrong-insertion protector 9 (see FIGS. 35A and 35B) of the floppy desk 1, which is already described, pushes the end of the torsion coil spring 74 out so as to enable the insertion; however when the floppy desk 1 is to be inserted in an upside-down position, for example, the desk 1 is blocked by the end of the torsion coil spring 74 so as to prevent the wrong insertion.

Eject Button

Figure 17A:
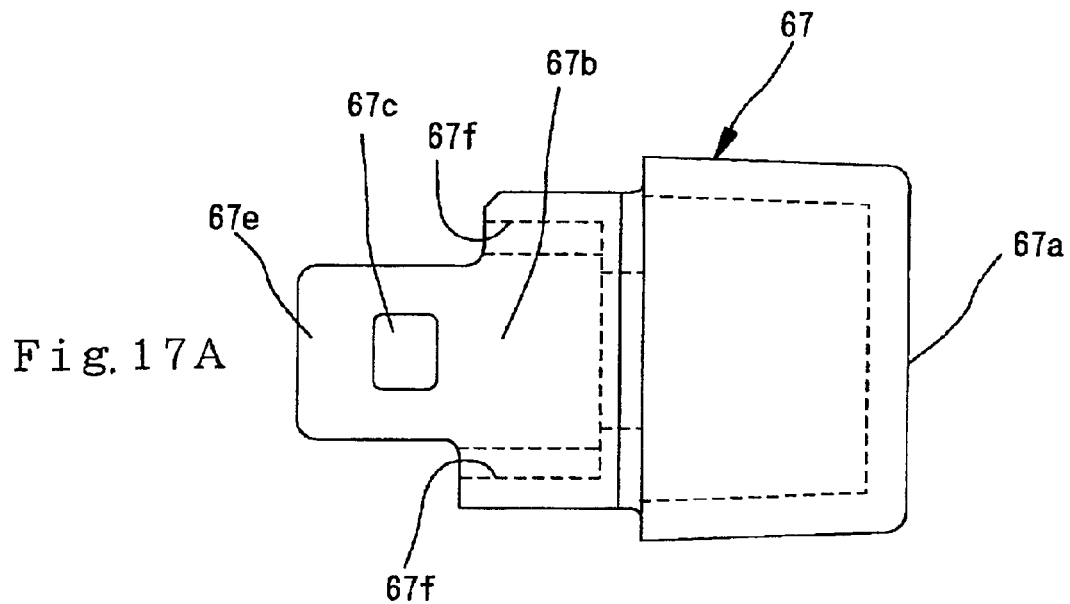
FIG. 17A is a plan view of an eject button.
Figure 17B:
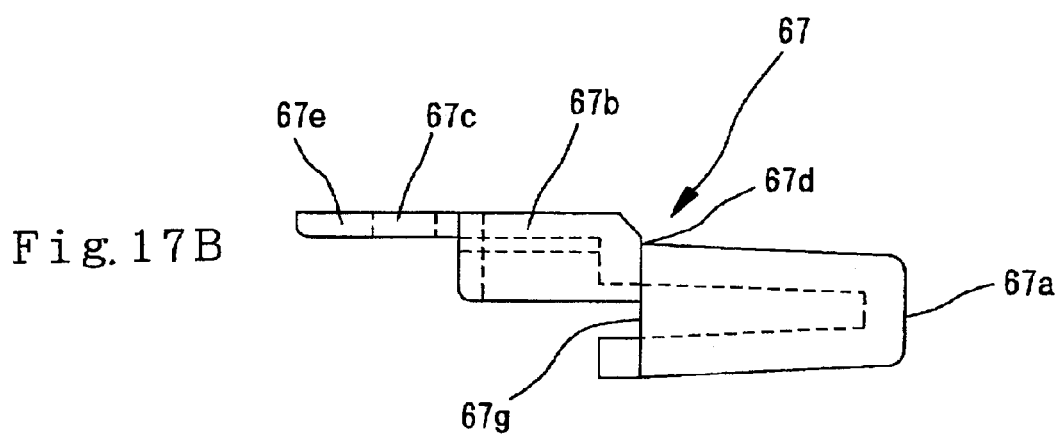
FIG. 17B is a front view of the eject button.
Figure 18:
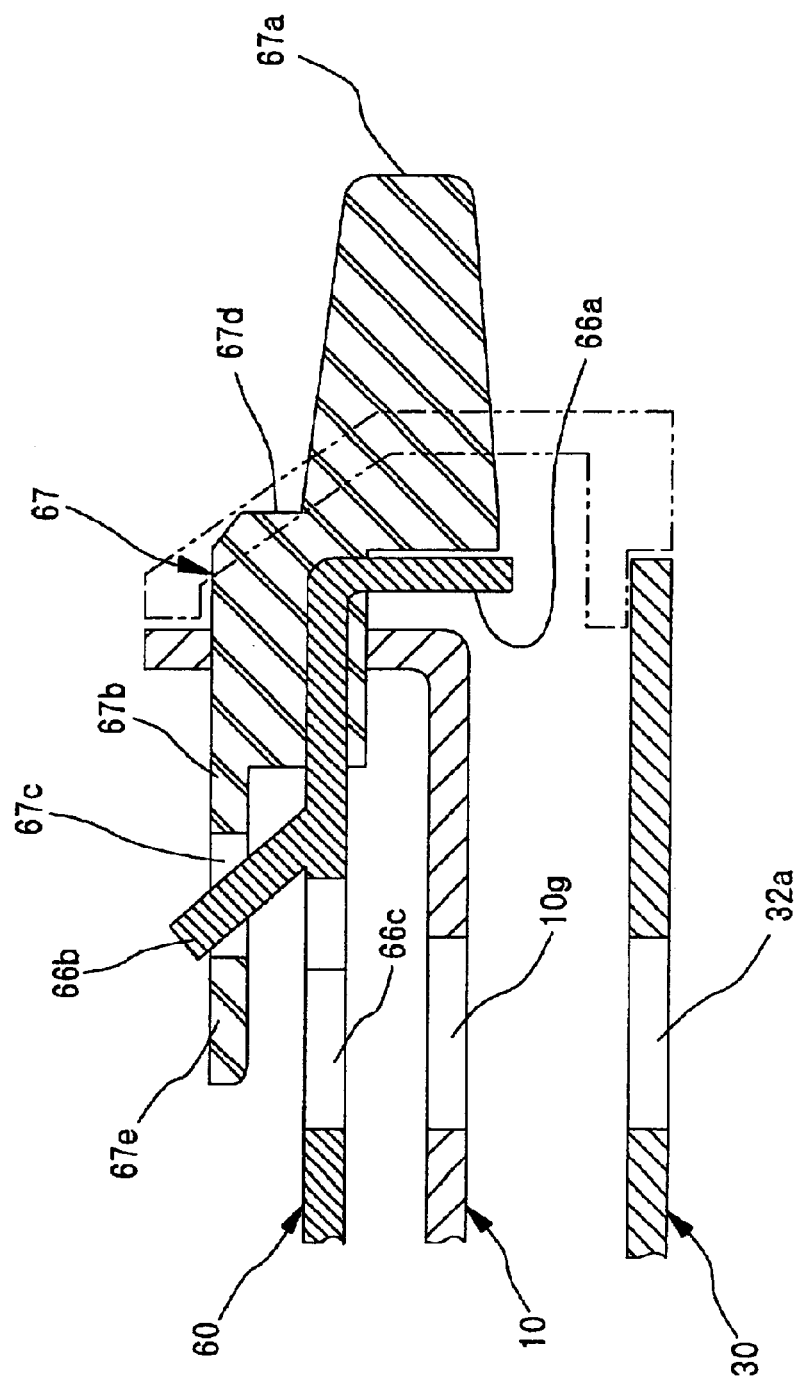
FIG. 18 is a sectional view showing the positional relationship between the eject button, the slider, the frame, and the lower cover.

FIGS. 17A and 17B are drawings showing an eject button; FIG. 18 is a drawing showing a state of the eject button mounted on the slider.

The eject button 67 is a resin molding, and as shown in FIGS. 17A and 17B, it comprises a pressing part 67a formed at the front end to be pressed with a finger and an engaging part 67b formed at the rear end to be engaged with the slider 60, which will be described later. The engaging part 67b is provided with an engaging hole 67c formed for engaging a retainer piece 66b formed in the slider 60.

The engaging part 67b is provided with an engagement-cancellation part 67e formed at the rear end and having a thin thickness and elasticity. Between the pressing part 67a and the engaging part 67b, a stepped part 67d is formed. The stepped part 67d abuts the wall of the slotted hole 54 (see FIG. 13), which is formed in the front panel 50 and described above, so that the pressing part 67a ahead of the stepped part 67d is configured so as to protrude from the front surface of the front panel 50.

The engaging part 67b is provided with fitting grooves 67f formed to be fitted to a projection 66e (see FIG. 1C) of the slider 60, which will be described later, and an abutting part 17g formed to abut a tongue part 66a.

Referring to FIG. 1C, at the front end of the slider 60, the tongue part 66a is formed to protrude for fixing the eject button 67.

In the slider 60, a retainer piece 66b, which is engaged with the engaging hole 67c formed in the eject button 67, is formed so that the front end is obliquely raised by a pressing process. In the vicinity of the retainer piece 66b, a punched hole 66c, which is a second opening, is formed.

The punched hole 66c is formed at a position overlapping with the engagement-cancellation part 67e of the eject button 67 in a state that the eject button 67 is attached to the slider 60. At the end of the slider 60 in the vicinity of the retainer piece 66b, a raised-and-bent part 66d is formed. The raised-and-bent part 66d has a function of reinforcing the strength of the vicinity of the punched hole 66c for forming the punched hole 66c. As mentioned above, the projection 66e, which is to be fitted into the fitting grooves 67f of the eject button 67, is formed in the slider 60.

Referring to FIGS. 4A and 4B, on the bottom wall 10a of the frame 10, an operation hole 10g, which is a first opening, is formed. The operation hole 10g is formed at a position respectively overlapping with the above-mentioned engagement-cancellation part 67e of the eject button 67 and the punched hole 66c of the slider 60. In the peripheral part of the operation hole 10g, a projection 10h is formed to downwardly protrude by a pressing process (half-blanking process). The projection 10h has a function of reinforcing the strength of the vicinity of the operation hole 10g.

Referring to FIGS. 6A and 6B, the lower cover 30 is provided with a bottom plate 30a, a run-off hole 32 for the disk-drive-motor unit 300, which is formed on the bottom plate 30a, and a cut-out 32a being a third opening, which is communicated to the run-off hole 32. The notch 32a is formed at a position planarly overlapping with the engagement-cancellation part 67e of the eject button 67, the punched hole 66c formed in the slider 60, and the operation hole 10g formed on the bottom wall 10a of the frame 10. Thereby, the engagement-canceling operation of the eject button 67 can be performed from the back side of the lower cover 30.

Referring to FIG. 18, the above-mentioned eject button 67 is attached to the slider 60 in a state that the engaging hole 67c is engaged with the retainer piece 66b of the slider 60.

As described above, the engagement-cancellation part 67e of the eject button 67 can be seen from the cut-out 32a of the lower cover 30 via the operation hole 10g of the frame 10 and a run-off hole 4c of the slider 60. That is, by operating the eject button 67 from the back side of the lower cover 30, the eject button 67 can be released from the slider 60.

That is, as shown in FIG. 18, in a state that only the front panel 50 is removed, by using an operating rod (not shown), which is slightly smaller than the operation hole 10g in diameter, the external surface of the engagement-cancellation part 67e of the eject button 67 is pressed from the back side of the lower cover 30 via the cut-out 32a of the lower cover 30, the operation hole 10g of the frame 10, and the run-off hole 4c of the slider 60.

Due to this operation, the engagement-cancellation part 67e deflects upwardly, so that it gets over the tip end of the retainer piece 66b of the slider 60 so as to cancel the engagement. At this time, by picking with fingers at the vicinity of the projections 67a of the eject button 67 to pull out it, the eject button 67 can be easily removed from the slider 60. Therefore, when removing the eject button 67, the upper cover 40 and the carrier 70 need not be removed.

The fabrication of the cut-out 32a of the lower cover 30, the operation hole 10g of the frame 10, and the run-off hole 4c of the slider 60 can be performed simultaneously with processing of the individual members, the additional man-hour is not required so that it does not result in increased cost.

Open-and-Close Lever

FIGS. 19A and 19B are plan views of an open-and-close lever for opening and closing the shutter of the floppy desk.

The open-and-close lever 80 is rotatably supported on the bottom wall 10a of the flame 10 with a shaft journaled by bearings while being always urged counterclockwise when viewing the drawing by a torsion coil spring 81. The open-and-close lever 80 has a cam 83 having the circular cam surface 83a with center at a rotational shaft 82 and a pressing part 84 for sliding the shutter 4, these which are formed integrally.

The cam surface 83a is brought into and out of engagement with the engaging projection 65 formed in the slider 60. That is, when the floppy disk 1 is to be inserted, the pressing part 84 of the open-and-close lever 80 is brought into engagement with one end of the shutter 4 as shown in FIG. 19A. At this time, the engaging projection 65 formed in the slider 60 is brought into engagement with the cam surface 83a so that the forward movement is blocked.

When the floppy disk 1 is further pushed forward from this state, the open-and-close lever 80 is rotated clockwise when viewing the drawing by being pushed with the front end of the case body 2 while the pressing part 84 of the open-and-close lever 80 pushes and opens the shutter 4 in the left when viewing the drawing so as to expose the magnetic-disk board 3 via the exposure opening 2a, as shown in FIG. 19B.

Then, the engagement between the engaging projection 65 formed in the slider 60 and the cam surface 83a is canceled, and as a result, due to the urging force of the coil spring 68 (see FIG. 14), the slider 60 moves forward. According to the movement of the slider 60, the carrier 70 is moved downwardly so as to complete the loading of the floppy disk Magnetic Head Unit FIGS. 20A to 20D are drawings of the magnetic head unit.

The magnetic head unit 100, as shown in these drawings, comprises a lower-head support member 111, called a carriage, for supporting a lower magnetic head 110 and an upper-head support member 121 for supporting an upper magnetic head 120.

In the lower-head support member 111, the lower magnetic head 110 is mounted at the front end via a junction plate 112, and at the rear end, a base 113 for fixing the upper-head support member 121 is arranged.

As already described, the driven part 114 extends from one side edge of the lower-head support member 111, and the driven part 114 is engaged with the screw 202 of the head driving mechanism 200 (see FIG. 3). As shown in FIG. 20D, the other side edge of the lower-head support member 111 is provided with the guided part 116 having the through-hole 116a formed therein, into which the guide rod 203 is inserted, as described above.

Figure 21:
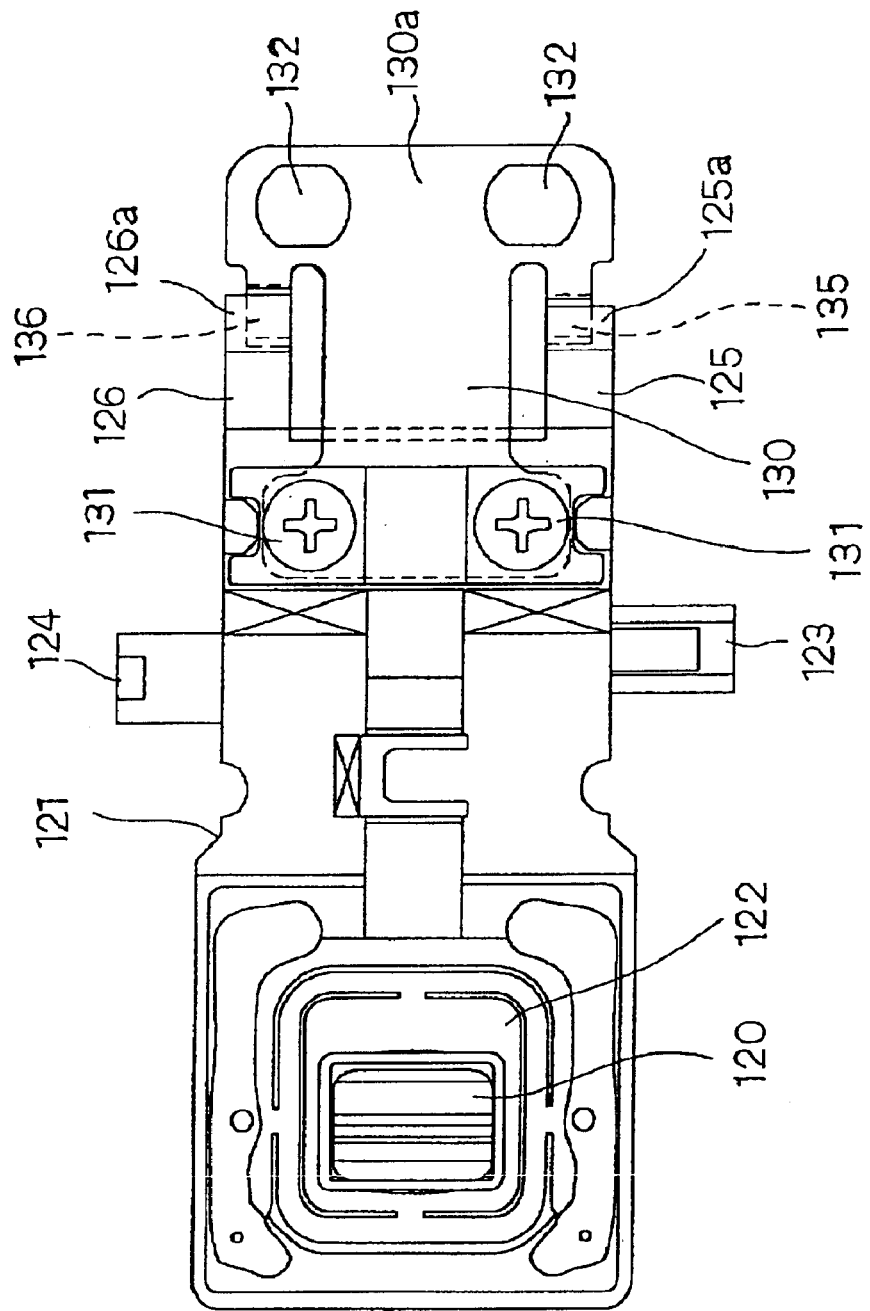
FIG. 21 is a bottom plan view of an upper head-supporting member.
Figure 22:
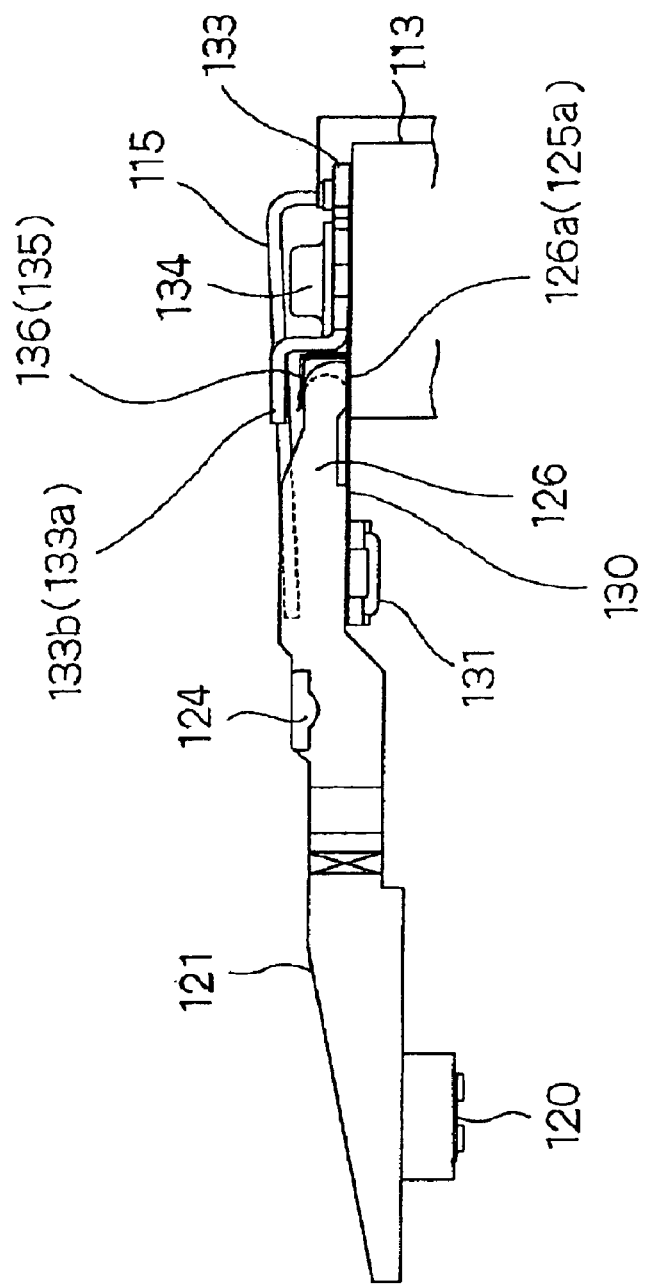
FIG. 22 is a side view of the upper head-supporting member.
Figure 23:
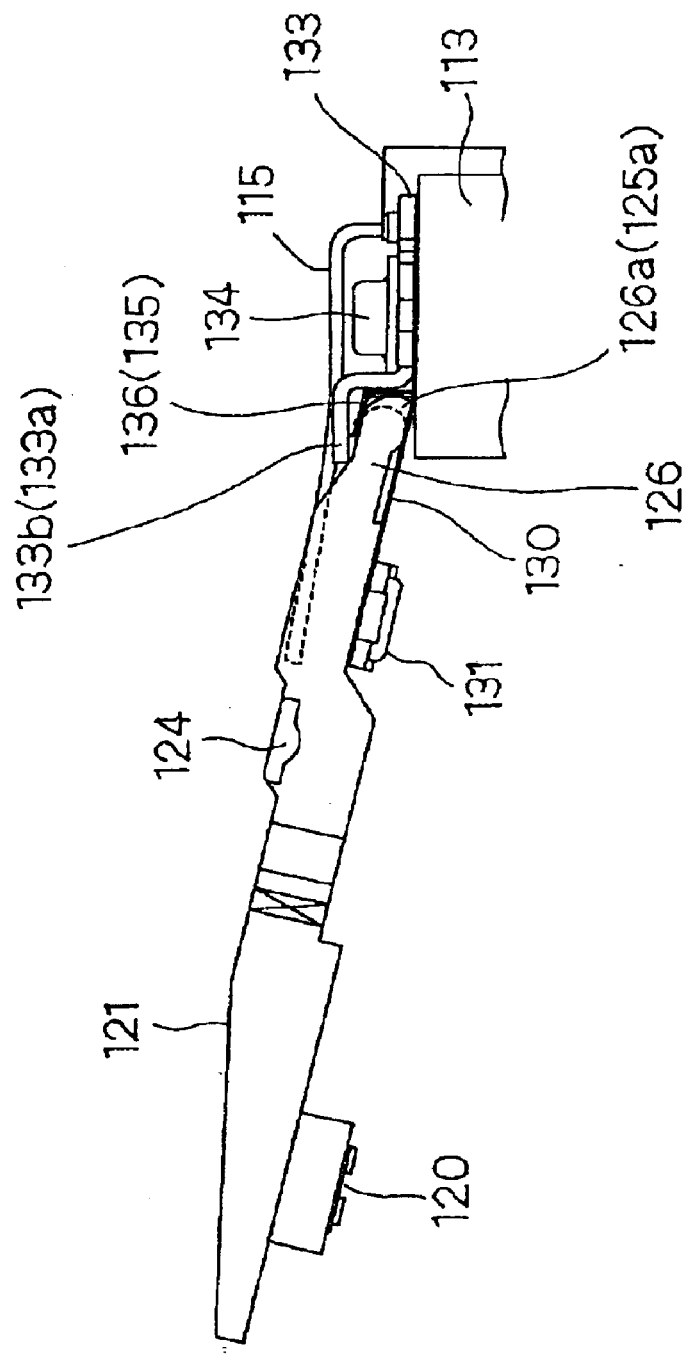
FIG. 23 is a side view of the upper head-supporting member in a raised state.

FIG. 21 is a bottom plan view of the upper-head support member; FIGS. 22 and 23 are side views of the upper-head support member.

At the front end of the upper-head support member 121, as shown in FIG. 21, the upper magnetic head 120 is mounted via a support spring 122 called a ginbal spring. That is, the upper magnetic head 120 is firmly fixed to the center of the support spring 122 and the periphery of the support spring 122 is bonded on the bottom surface of the upper-head support member 121 at the front end with a UV adhesive (ultra violet curable adhesive), etc.

From one side surface of the upper-head support member 121, a push-up lever 123 extends sideways, which is engaged with the edge of the cut-out 73 formed in the carrier 70, as shown in FIG. 15, so that the push-up lever 123 has a function of lifting the front end of the upper-head support member 121 (i.e., the upper magnetic head 120) in accordance with the upward movement of the carrier 70.

From the other side surface of the upper-head support member 121, an auxiliary lever 124 extends sideways, which lightly comes in contact with the carrier 70 in the state that the front end of the upper magnetic head 120 is raised so as to suppress the vibration of the upper-head support member 121.

Furthermore, from both sides of the upper-head support member 121 at the rear end, first and second legs 125 and 126 extend rearward. The bottom surfaces at the rear ends of the first and second legs 125 and 126 form respective rotational fulcrums 125a and 126a that are arranged so as to come in contact with the base 113 (see FIGS. 22 and 23).

In the rear center of the upper-head support member 121, a leaf spring member 130 is fixed with fasteners 131 such as screws and the leaf spring member 130 extends rearward by passing through the intermediate portion between the first and second legs 125 and 126.

Figure 24A:
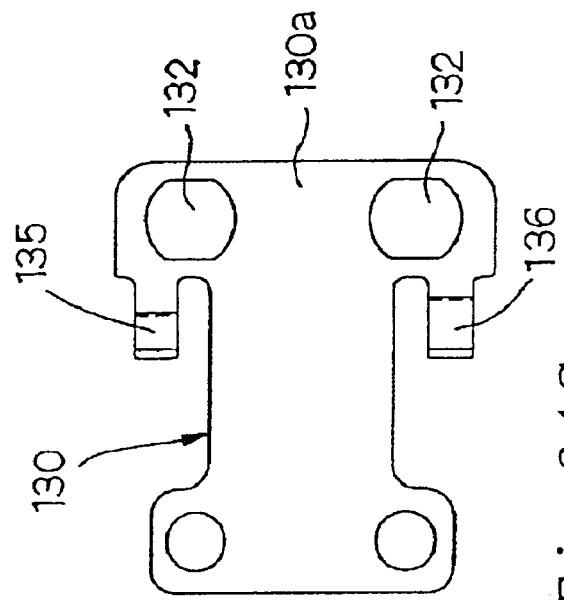
FIG. 24A is a plan view of a leaf spring member.
Figure 24C:
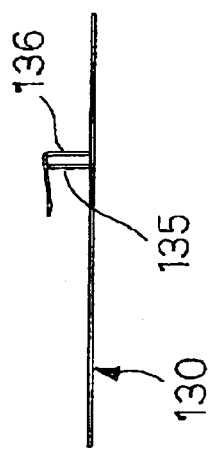
FIG. 24C is a side view of the leaf spring member.
Figure 24B:
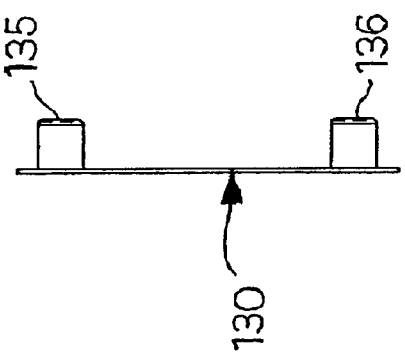
FIG. 24B is a front view of the leaf spring member.

The leaf spring member 130, as shown in FIGS. 24A to 24C, has a substantial T-shape, in which a base 130a extends in both sides and has fastening holes 132 formed therein. On the top surface of the base 130a of the leaf spring member 130, a fixing member 133 made of a metallic plate is overlapped while fasteners 134 such as screws are inserted into the fastening holes 132 so as to be screwed into the base 113, thereby fixing the base 130a of the leaf spring member 130 to the base 113 (see FIG. 22).

Furthermore, the base 130a of the leaf spring member 130 is provided with a pair of pressing-spring parts 135 and 136 formed therein, which are bent to be L-shaped. These pressing-spring parts 135 and 136 have a function of restraining the legs 125 and 126 from rising from the base 113 by pressing the rear ends of the first and second legs 125 and 126 arranged on the top surface of the base 113 from the upper side.

That is, even when an external force such as vibration is applied to the upper-head support member 121, the rotational fulcrums 125a and 126a of the first and second legs 125 and 126 are pressed and supported by the pressing-spring parts 135 and 136 so that the excessive rising and displacements of the rotational fulcrums 125a and 126a can be prevented. As a result, there is no possibility that the upper magnetic head may shift during recording on and reproducing from a disk so as to secure the stable recording and reproducing operation.

When the push-up lever 123 is raised in accordance with the upward movement of the carrier 70, the upper-head support member 121 rotates about the rotational fulcrums 125a and 126a formed on the bottom surface of the first and second legs 125 and 126 at the rear end; however, at this time, the rising would be produced in the rotational fulcrums 125a and 126a from the spring force of the leaf spring member 130 alone.

Moreover, since the push-up lever 123 extends from one side surface of the upper-head support member 121, when the push-up lever 123 is raised, a torsional torque is produced in the leaf spring member 130. When the torsion is produced in the leaf spring member 130 due to the torsional torque, the first leg 125 formed on the same side as that of the push-up lever 123 is especially raised largely about the central axis of the upper-head support member 121, and there is a possibility that the upper magnetic head 120 may be thereby inclined. When the upper magnetic head 120 is inclined, the entering floppy disk 1 interferes with the upper magnetic head 120, so that either or both of them may be damaged.

For such a problem, pressing the rotational fulcrums 125a and 126a of the first and second legs 125 and 126 with the pressing-spring parts 135 and 136 enables the rising of the rotational fulcrums 125a and 126a to be suppressed, resulting in the prevention of the problem.

In addition, when the push-up lever 123 is lifted, if the rotational fulcrum 125a of the first leg 125 is slightly raised from the base 113 due to the torsional torque applied to the leaf spring member 130 even when the first leg 125 is pressed and supported by the pressing-spring part 135, it is preferable that the inclination of the upper magnetic head 120 due to the rising be corrected by appropriately shifting the rotational fulcrum 126a of the second leg 126 rearward relative to the position of the rotational fulcrum 125a of the first leg 125.

Also, the above-mentioned fixing member 133 is provided with a first cover 133a formed at a position corresponding to the rear end of the first leg 125 and a second cover 133b formed at a position corresponding to the rear end of the second leg 126. These covers 133a and 133b cover the rear ends of the respective legs 125 and 126 from the further external peripheries of the pressing-spring parts 135 and 136 so as to restrict the excessive rising of the rotational fulcrums 125a and 126a from the base 113 due to a sudden impact.

Furthermore, on the base 113, as shown in FIG. 20C, a torsion coil spring 115 is arranged, and the center of the top surface of the upper-head support member 121 is downwardly urged by the torsion coil spring 115. Due to the urging force by the torsion coil spring 115, the upper-head support member 121 is always urged in the direction that the end thereof descends.

Circuit Board

Figure 25A:
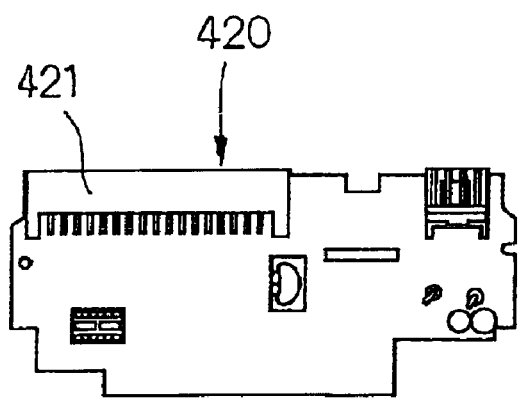
FIG. 25A is a plan view of a main control-circuit-board.
Figure 25B:
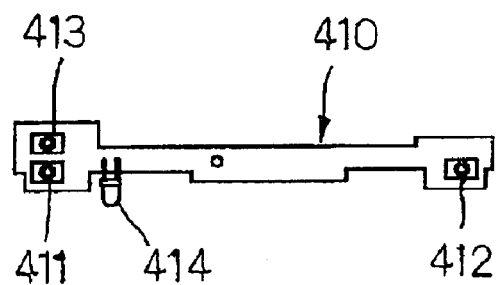
FIG. 25B is a plan view of a sensor-circuit-board.
Figure 25C:
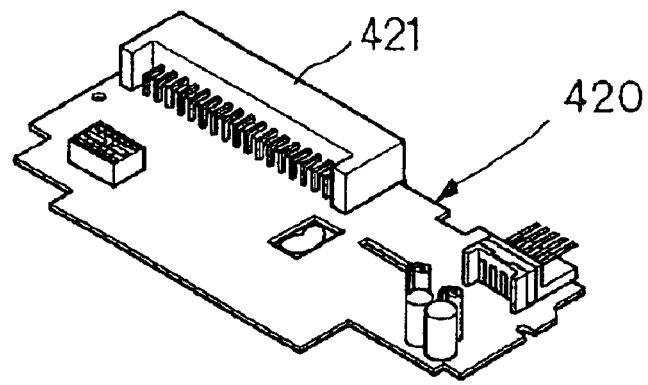
FIG. 25C is a perspective view of the main control-circuit-board.
Figure 25D:
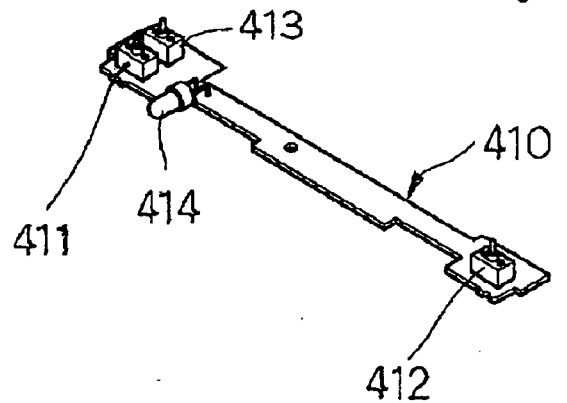
FIG. 25D is a perspective view of the sensor-circuit-board.

FIGS. 25A to 25D are drawings showing various types of circuit boards built in the disk drive apparatus according to the embodiment; FIG. 26A is a bottom plan view showing a state that the circuit boards are mounted on the bottom plate of the frame; FIG. 26B is an enlarged front view of the region II of FIG. 26A viewed in the arrow X direction; FIG. 26C is an enlarged front view of the region II of FIG. 26A viewed in the arrow Y direction; and further FIG. 27 is a plan view showing a layout of the circuit boards on a parent material.

In the disk drive apparatus according to the embodiment, as shown in FIGS. 25A to 25D, two types of circuit boards that are the sensor circuit-board 410 and the main control-circuit-board 420 are mounted on the bottom wall 10a of the frame 10 from the back side.

Among them, the sensor circuit-board 410 is a circuit board for mounting various types of sensors; according to the embodiment, the sensor circuit-board 410 is provided with a switch (write-protect-detecting switch) 411 for detecting whether the floppy disk 1 inserted thereinto is write-protected or not, a disk-type-identifying switch 412 for identifying the type of floppy disk 1 (2HD or 2DD), and a disk-insertion detecting switch 413 for distinguishing whether the floppy disk 1 is properly inserted or not, these which are mounted thereon.

Figure 26A:
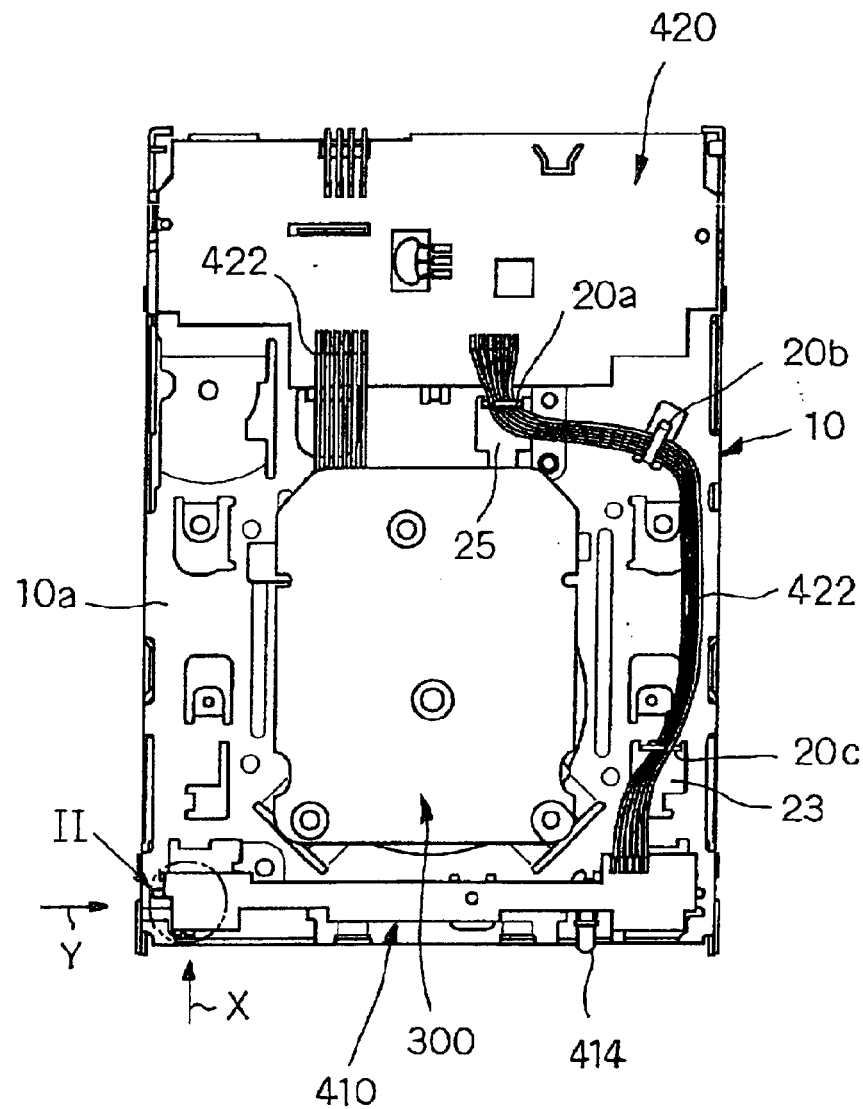
FIG. 26A is a bottom plan view of each circuit board shown in FIGS. 25A to 25D in a mounted state on a frame bottom plate.
Figure 26C:
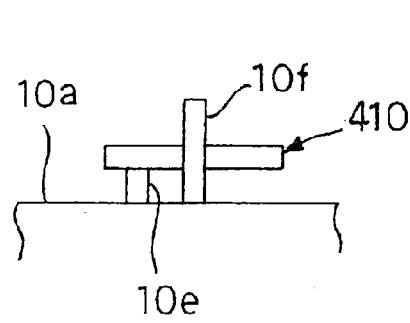
FIG. 26C is an enlarged side view of the region II of FIG. 26A viewed in the arrow Y direction.
Figure 26B:
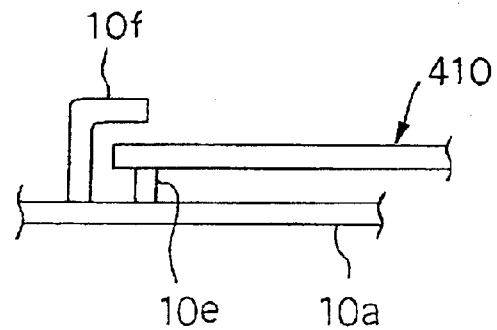
FIG. 26B is an enlarged front view of the region II of FIG. 26A viewed in the arrow X direction.
Figure 27:
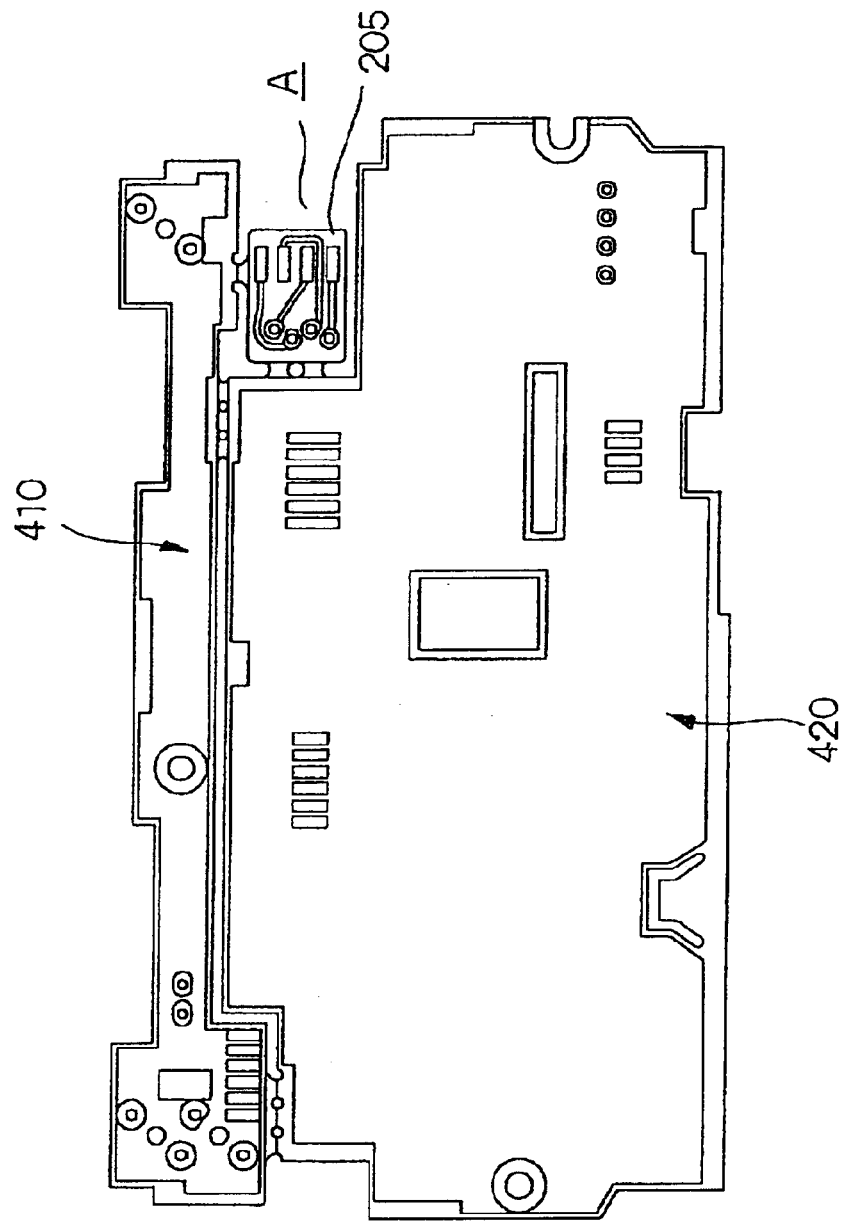
FIG. 27 is a plan view of each circuit board shown in FIGS. 25A to 25D showing a layout on a parent material.

The sensor circuit-board 410, as shown in FIGS. 26A to 26C, is mounted at the front end of the bottom wall 10a of the frame 10 along the front end edge. That is, the sensor circuit-board 410 is fixed on the bottom wall 10a by fastening only one portion of the board 410 with one fastener (a screw, for example). The fastening of one portion of the sensor circuit-board 410 with one fastener 415 in such a manner has an effect to restrain the production of internal stress by allowing the deformation of the board 410 to some extent. In particular, since the sensor circuit-board 410 is formed to be an elongated shape as shown in FIGS. 25B and 25D, it is liable to be damaged due to the production of internal stress, so that the above-mentioned mounting structure to the frame becomes effective.

Also, on the bottom wall 10a of the frame 10, as shown in FIGS. 26B and 26C, projection pieces 10e and 10f for supporting the circuit board (supporting parts for the circuit board) formed by cutting the bottom wall 10a are formed at positions that both side edges of the sensor circuit-board 410 are arranged. Among them, the projection piece 10e is formed on the bottom wall 10a by cut-up downward while the projection piece 10f is formed by bending the bottom wall 10a to be L-shaped.

Both ends of the sensor circuit-board 410 are arranged between the projection pieces 10e and 10f, respectively, and are supported by abutting the projection pieced 10e. Between the L-shaped projection piece 10f and the sensor circuit-board 410, a small clearance is formed and the board is flexible within the clearance.

In this arrangement, the write-protect-detecting switch 411 is mounted and fixed on the sensor circuit-board 410 at a position opposing the write-protect detector 6 (see FIG. 35A) arranged in the entering floppy disk 1. Also, the disk-type-identifying switch 412 is similarly mounted and fixed on the sensor circuit-board 410 at a position opposing the disk type-detector 8 (see FIG. 35A) arranged in the floppy disk 1.

The disk-insertion detecting switch 413 is mounted thereon next to the write-protect-detecting switch 411 at the rear. In addition, on the sensor circuit-board 410, together with these sensor switches 411, 412, and 413, and LED 414 is mounted for displaying the driving state of the disk drive apparatus by light-emission.

On the other hand, on the main control-circuit-board 420, a main control circuit in the disk drive apparatus is mounted, which has a function of controlling the above-mentioned stepping motor 201 and the disk-drive motor 303. The main control-circuit-board 420 is also provided with an I/F (interface) male connector 421a exposing connection pins for connecting to external equipment, and a power supply connector 421b for connecting to a power supply. To the I/F male connector 421a, a female connector 430 for external equipment (referred to as an external female connector, below) is connected so as to electrically connect to the external equipment with a female connector cable 431.

The main control-circuit-board 420, as shown in FIG. 26A, is fixed on the rear back surface of the bottom wall 10a of the frame 10 with screws, and is electrically connected via lead wire 422 to a terminal board 205 (see FIG. 3, for example) of the already mentioned stepping motor 201, the motor base-board 302, and the sensor circuit-board 410. In addition, on the bottom wall 10a of the frame 10, as shown in FIG. 26A, there are hook-like lead-wire holders 20a, 20b, and 20c formed by cutting out at appropriate positions for holding the lead wire 422 by hooking thereon, which connects between the main control-circuit-board 420 and the sensor circuit-board 410.

By the way, FIG. 20D is an enlarged right side-view of the region I of FIG. 20A; as shown FIG. 20D, the above-mentioned guided part 116 of the magnetic head unit 100 for inserting the guide rod 203 takes a shape protruding downwardly from a bottom surface 111a. Then, on the bottom wall 10a of the frame 10, a cut-out hole 25 is formed for avoiding the interference with the guided part 116 (see FIGS. 4A and 4B). The above-mentioned lead-wire holder 20a is formed by using a portion cut-out from the bottom wall 10a of the frame 10 when forming the cut-out hole 25.

The lead-wire holder 20c is also formed by cut-up from an edge of the engaging hole 23 formed on the bottom wall 10a of the frame 10. The engaging hole 23, as mentioned above, is formed when forming a retainer 21 for retaining one end of the coil spring 68 by cut-up, and by using a portion cut-out from the engaging hole 23, the lead-wire holder 20c is formed.

In the disk drive apparatus according to the embodiment, the sensor circuit-board 410 and the main control-circuit-board 420, as described above, are constructed as separate circuit boards, so that the apparatus can be miniaturized, and positioning accuracies during assembling are improved because processing errors of members and effects by expansion and contraction are reduced compared with those when the boards 410 and 420 are integrally formed. Moreover, the degree of positioning freedom on the bottom wall 10a of the frame 10 is increased, enabling the flexible design of the apparatus.

For example, the sensor circuit-board 410 and the main control-circuit-board 420 can be arranged at positions with different heights, so that the interference with surrounding structural elements can be readily avoided.

Furthermore, according to the embodiment, the sensor circuit-board 410 and the main control-circuit-board 420 are formed in respective shapes having substantially the same width and being close to a rectangle with small unevenness, so that in an economical layout with small waste, the sensor circuit-board 410 and the main control-circuit-board 420 are configured from a parent material by cutting out.

That is, as shown in FIG. 27, the sensor circuit-board 410 and the main control-circuit-board 420 having respective shapes with substantially the same width and being close to a rectangle are arranged in the same width so as to adjoin each other in the front and rear, resulting in reduction of parent material waste to the utmost.

In the layout shown in FIG. 27, there is remained a portion to be scrapped indicated by A in the drawing, although which is small; however, from this portion, a small board such as the terminal board 205 of the stepping motor 201 can be cut out so as to use the parent material more efficiently.

Restricting Part of External Connector FIGS. 28 to 31 are drawings for showing restricting parts of external connectors.

As mentioned above, the main control-circuit-board 420 is provided with the I/F (interface) male connector 421a exposing connection pins for connecting to external equipment, and the power supply connector 421b for connecting to the power supply. To the I/F male connector 421a, the external female connector 430 is attached so as to electrically connect to the external equipment with the female connector cable 431 (see FIG. 2).

The external female connector 430 and the female connector cable 431, as is understood also from FIG. 2, are connected together at a substantial right angle to the insertion direction of the external female connector 430, so that the female connector cable 431 is arranged perpendicularly to the bottom surface of the external female connector 430.

Figure 29:
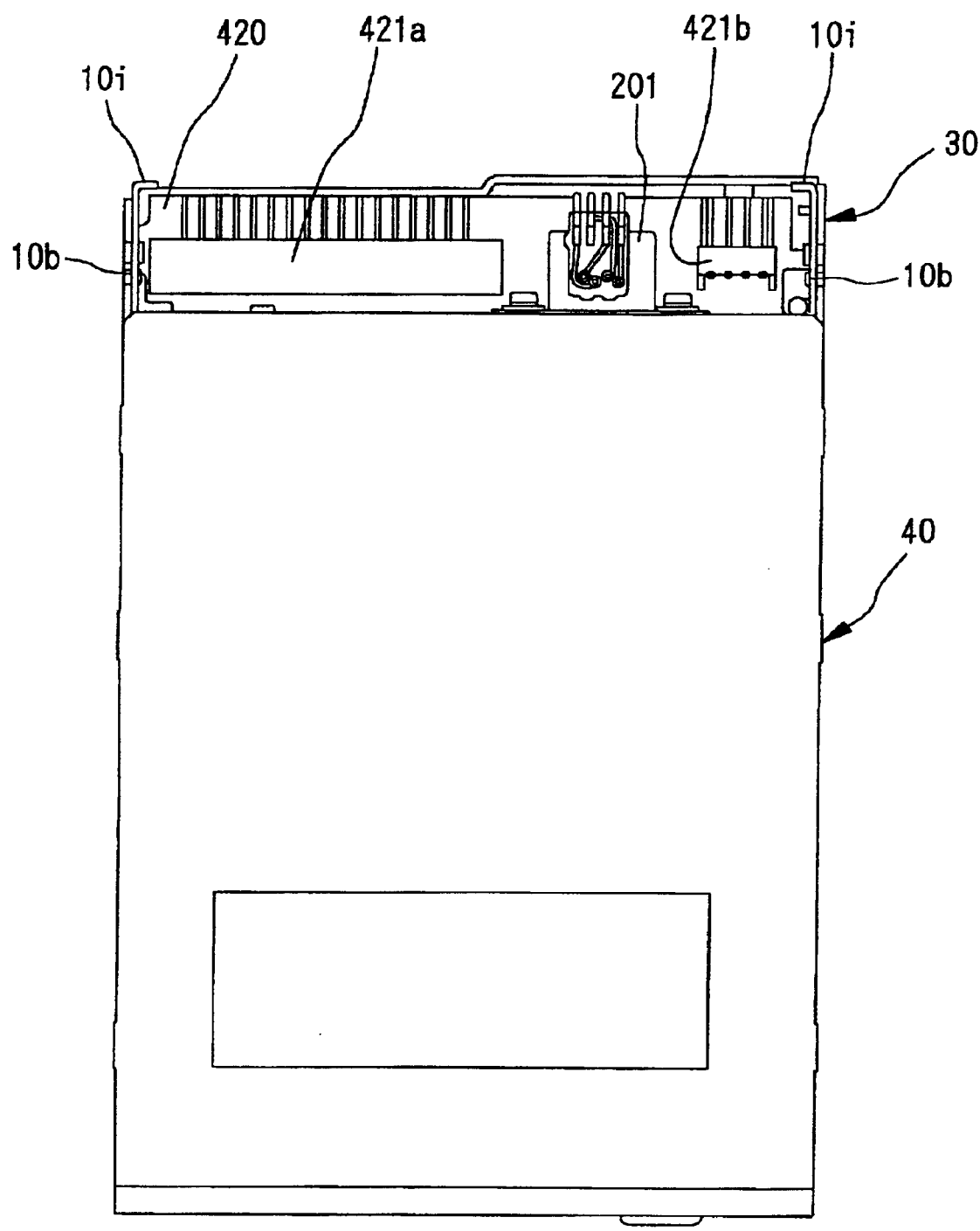
FIG. 29 is a plan view of the disk drive apparatus for showing the restricting part of the external connector.

Then, according to the embodiment, as shown in FIG. 29, the overall depth of the upper cover 40 is smaller than that of the lower cover 30, so that the I/F (interface) male connector 421a, the power supply connector 421b, and the stepping motor 201 are exposed from the upper cover 40. Therefore, the assembling and adjusting operation of the stepping motor 201 can be simply performed in a large space.

However, since the surroundings of both the connectors 421a and 421b are open spaces, when the external female connector 430 and a power supply plug (not shown) are respectively attached to both the connectors 421a and 421b, there are possibilities of positional displacements and miss-arrangements of the external female connector 430 and the power supply plug.

Then, at ends of both the side walls 10b of the frame 10, restricting parts 10i are integrally formed, and when the external female connector 430 and the power supply plug are attached to both the connectors 421a and 421b, the positional displacements and miss-arrangements are prevented with the restricting parts 10i.

The restricting parts 10i are located beside (in the lateral direction) both the connectors 421a and 421b. Therefore, when the external female connector 430 and the power supply plug are attached to both the connectors 421a and 421b, positional displacements in the lateral direction of the external female connector 430 and the power supply plug are restricted with the restricting parts 10i, so that the external female connector 430 and the power supply plug can be readily attached to both the connectors 421a and 421b without miss-arrangements.

Since the restricting parts 10i having a function of preventing miss-arrangements of external connectors, etc., are formed at ends of both the side walls 10b of the frame 10, even when the end face of the lower cover 30 and the end face of the main control-circuit-board 420 lie substantially on the same plane, the main control-circuit-board 420 need not be cut-out.

Since the end face of the lower cover 30 and the end face of the main control-circuit-board 420 lie substantially on the same plane, when the external female connector 430 is attached to the I/F male connector 421a, the female connector cable 431 leading to the external female connector 430 cannot float so that the external female connector 430 can be securely attached to the I/F male connector 421a.

Figure 28:
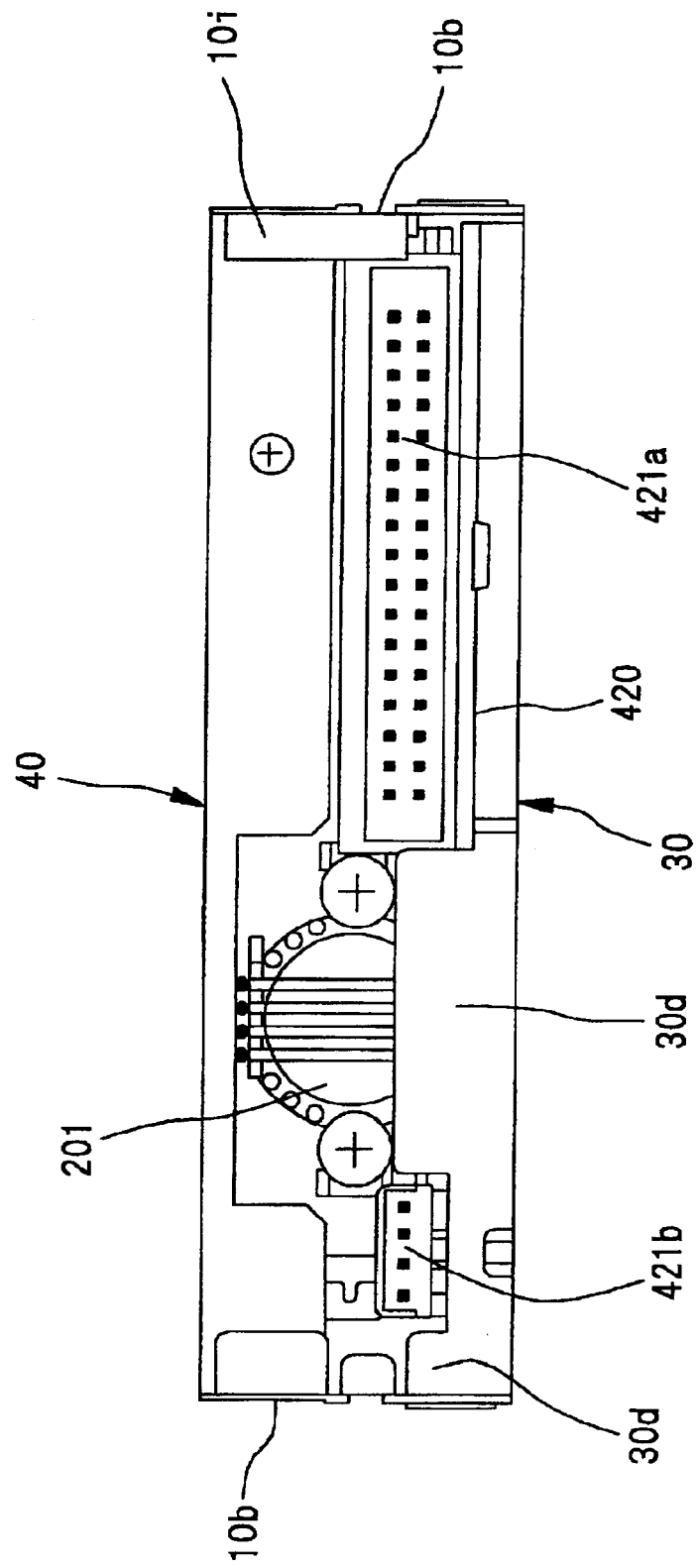
FIG. 28 is a rear elevational view of the disk drive apparatus for showing a restricting part of an external connector.

In addition to the restricting parts 10i formed in the frame 10, as means for preventing miss-arrangements of external connectors, etc., as shown in FIGS. 28 and 29, between the male connector 421a and the power supply connector 421b, a restricting part 30d is formed, which rises at a substantially right angle from the bottom surface of the lower cover 30.

Therefore, with the restricting parts 10i formed in the frame 10 and the restricting part 30d formed in the lower cover 30, the installing positions of the external female connector 430 and the power supply plug (not shown) are restricted in both sides of the connectors 421a and 421b, so that miss-arrangements of the external female connector 430 and the power supply plug can be further securely prevented.

In general, the positional relationship between the power supply plug (not shown) to be installed to the power supply connector 421b and a power supply cord extending therefrom is that different from the above-mentioned I/F male connector 421a, the power supply plug and the power supply cord are connected together on substantially the same line and in substantially the same direction relative to the inserting direction of the power supply plug into the power supply connector 421b, so that there is no possibility that the power supply cord abuts the end face of the restricting part 30d.

Figure 30:
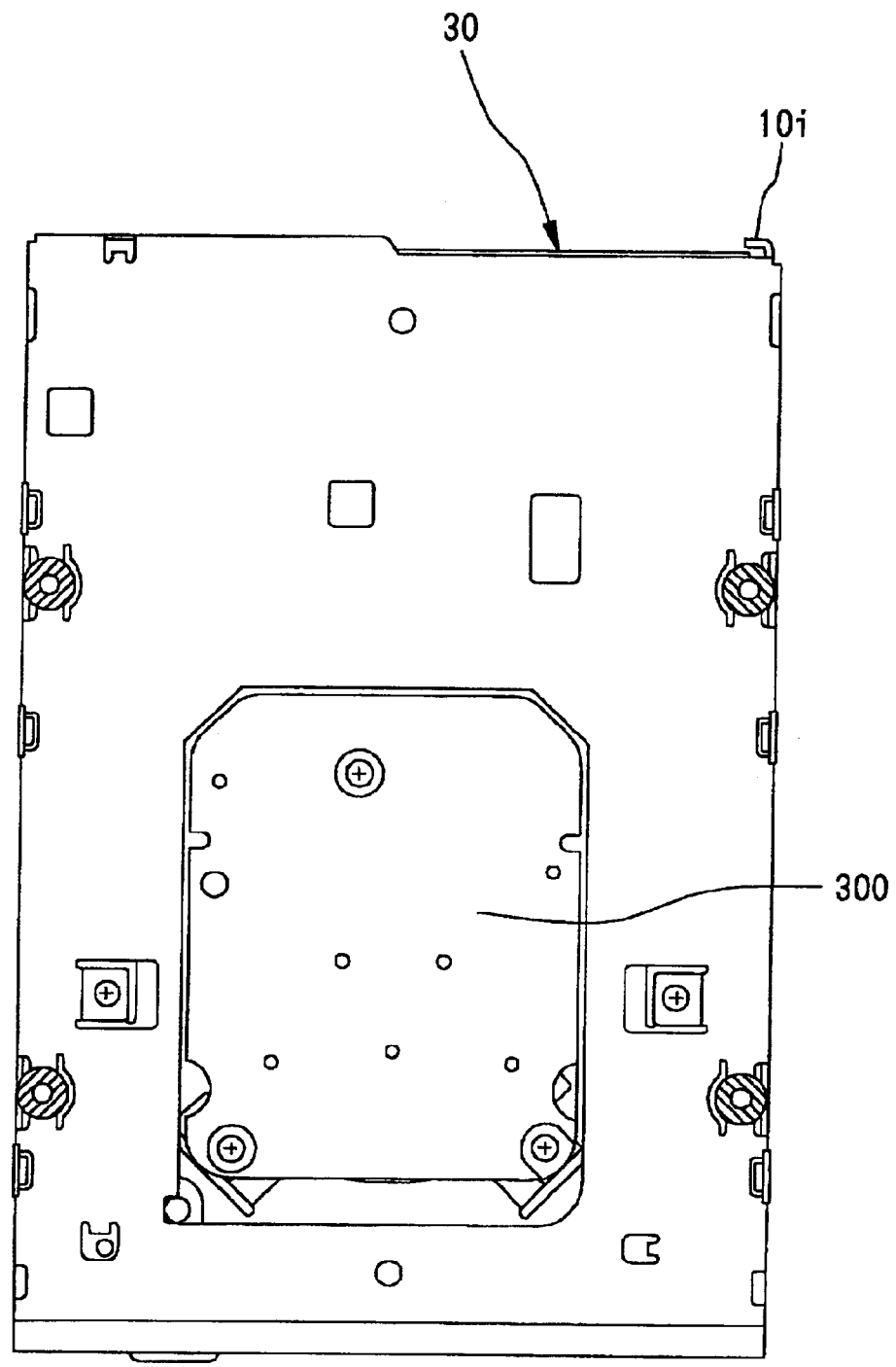
FIG. 30 is a bottom plan view of the disk drive apparatus for showing the restricting part of the external connector.

Accordingly, as shown in FIGS. 29 and 30, a projection 6e is formed in the lower cover 30 having the restricting part 30d of the power supply connector 421b formed therein so as to protrude outwardly from the I/F male connector 421a without any trouble. As a result, the restricting part 30d can be formed without cutting-out the main control-circuit-board 420.

Figure 31:
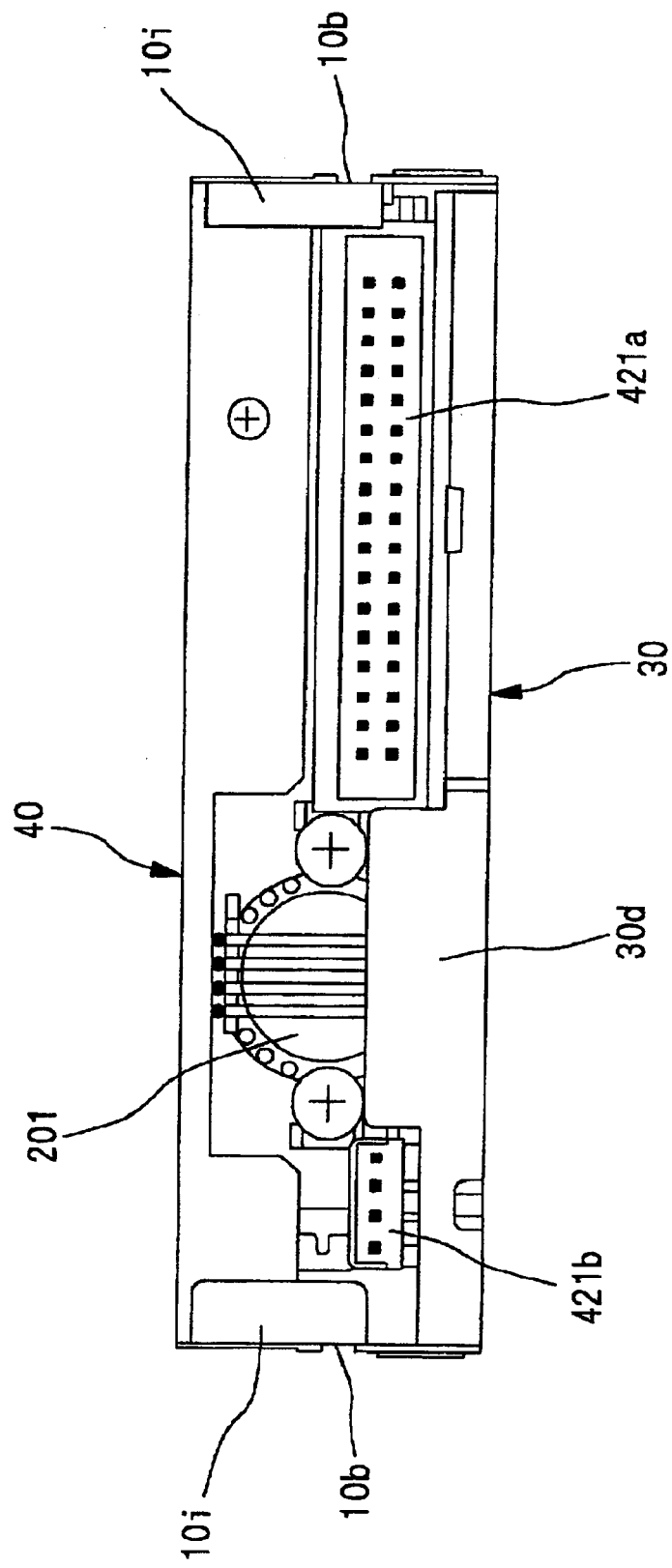
FIG. 31 is a rear elevational view of the disk drive apparatus for showing another structure associated with the restricting part of the external connector.

FIG. 31 is a drawing showing a modified example of the means for preventing miss-arrangements of external connectors, etc.

In the structure shown in the drawing, the restricting part 10i is formed only in the side wall 10b adjacent to the I/F male connector 421a in the frame 10. The prevention of miss-arrangements for the power supply connector 421b is achieved with the restricting parts 30d formed in the lower cover 30. The restricting parts 30d are formed in both lateral sides of the power supply connector 421b.

As described above, since the positional relationship between the power supply plug (not shown) to be installed to the power supply connector 421b and the power supply cord extending therefrom is that different from the above-mentioned I/F male connector 421a, the power supply plug and the power supply cord are connected together on substantially the same line and in substantially the same direction relative to the inserting direction of the power supply plug into the power supply connector 421b, the restricting part 30d of the lower cover 30 can be protruded outwardly from the end face of the circuit board (the circuit board need not be cut-out). Therefore, the restriction of miss-arrangements for the power supply connector 421b can also be performed with only the restricting part 30d of the lower cover 30.

Protecting Cover of Stepping Motor, etc.

Figure 33A:
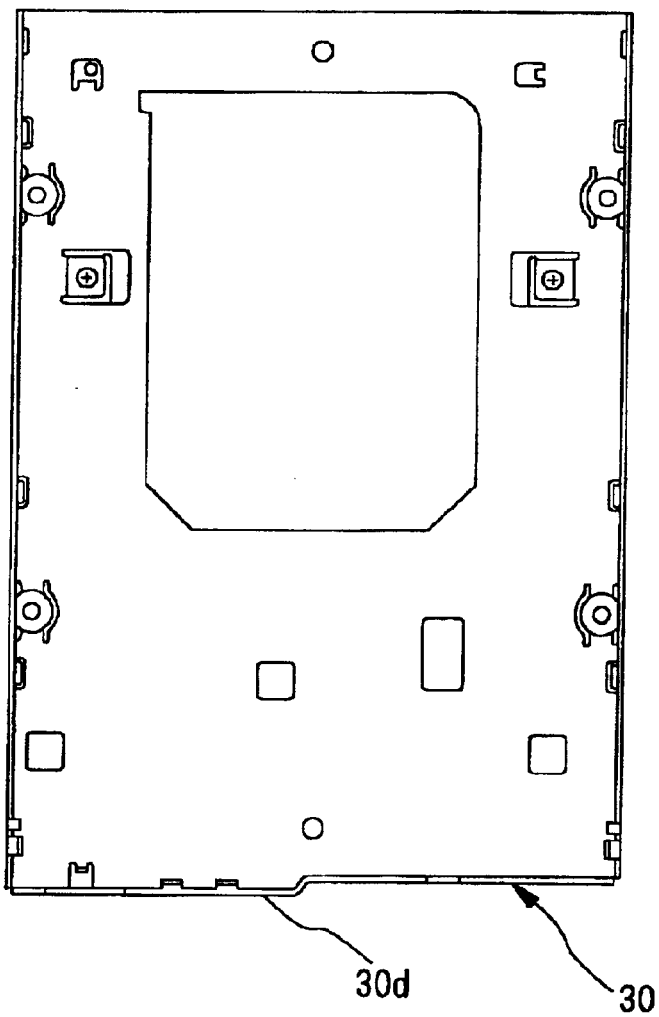
FIG. 33A is a plan view of the lower cover having a clamping tongue-piece formed therein.
Figure 33B:
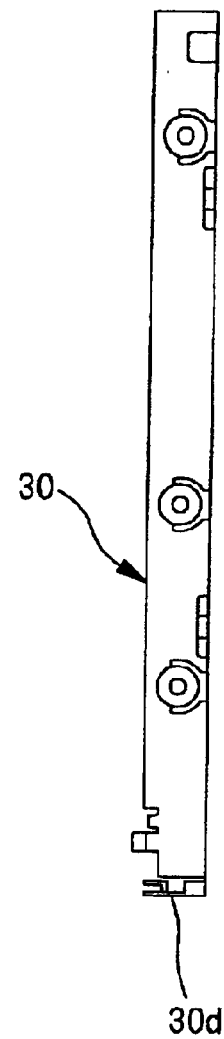
FIG. 33B is a side view of the lower cover having the clamping tongue-piece formed therein.
Figure 33C:
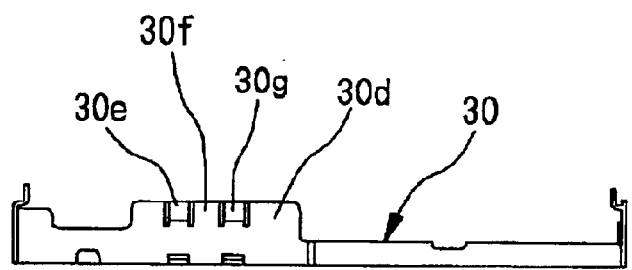
FIG. 33C is a front view of the lower cover having the clamping tongue-piece formed therein.
Figure 34:
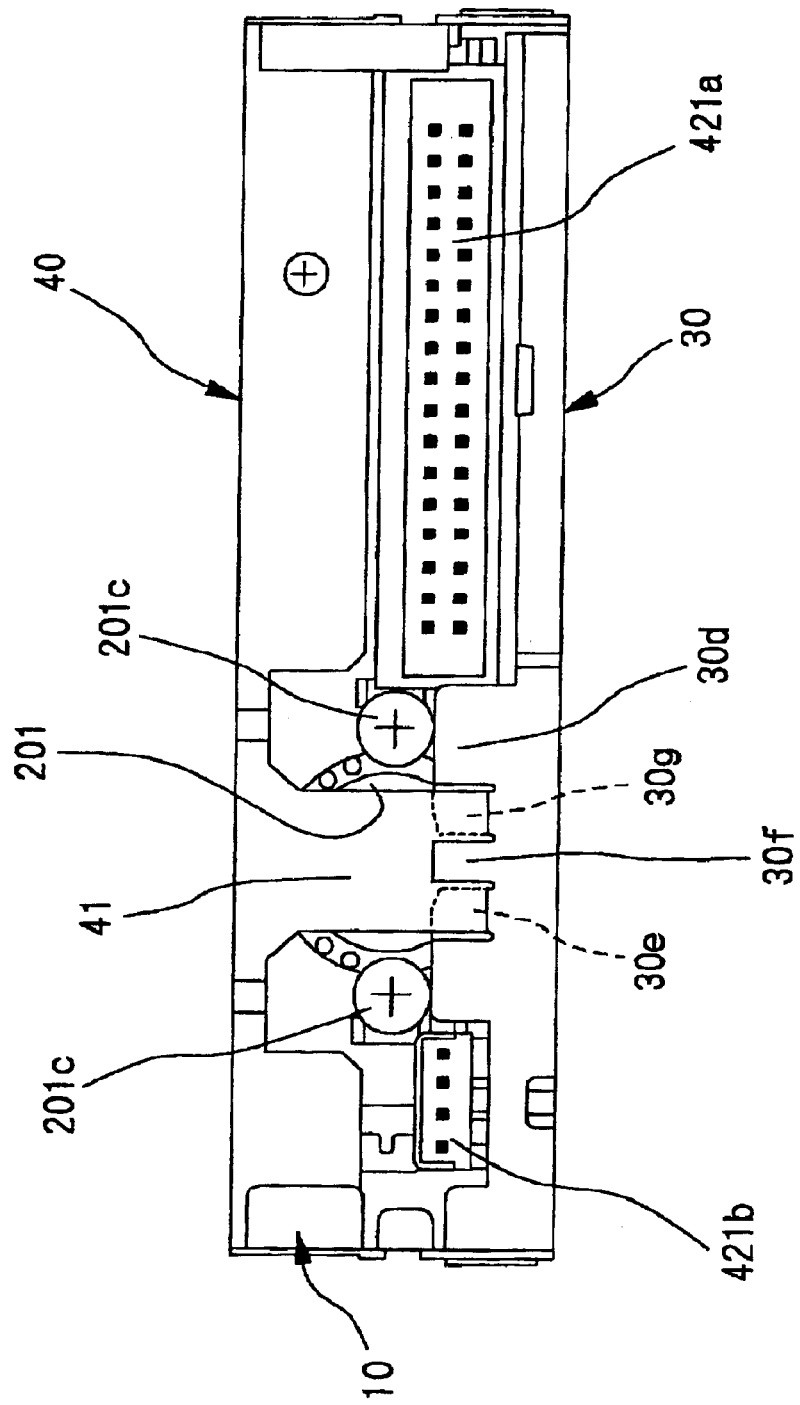
FIG. 34 is a rear elevational view of the disk drive apparatus having the upper cover shown in FIGS. 32A to 32C and the lower cover shown in FIGS. 33A to 33C, mounted thereon.

FIGS. 32A to 34 are drawings showing another structural example associated with upper and lower covers; FIG. 32A is a plan view of the upper cover; FIG. 32B is a side view of the upper cover; FIG. 32C is a front view of the upper cover; FIG. 33A is a plan view of the lower cover; FIG. 33B is a side view of the lower cover; FIG. 33C is a front view of the lower cover; and FIG. 34 is a drawing of a disk drive apparatus viewed from the rear side.

In the structural example shown in the drawings, at the rear end of the upper cover 40, a protecting cover 41 is formed. The protecting cover 41 is configured so as to cover the stepping motor 201, lead wire 201a, and a terminal base board 201b. In addition, the lead wire 201a is connection members for electrically connecting the stepping motor 201 and the main control-circuit-board 420 together.

The protecting cover 41 is integrally formed with the upper cover 40 in such a manner that the protecting cover 41 extends from the rear end-edge 40a of the upper cover 40 while being downwardly bent at a substantially right angle in an L-shape.

In association with the protecting cover 41, wherein the protruding length from the rear end-edge 40a is a; the bent height is b; and the bent width is c, the protruding length a is set to substantially coincide with that of a raised edge of the rear end of the lower cover 30, which will be described later. The bent height b is set to substantially coincide with positions, at which the protecting cover 41 abuts clamping tongue-pieces 30e, 30f, and 30g formed in the raised edge of the rear end of the lower cover 30. Furthermore, the bent width c is set to avoid the positions of screws 201c so as to facilitate the assembling and adjusting operation of the stepping motor 201.

As shown in FIGS. 33A to 33C, on the bottom surface of the frame 10, the lower cover 30 is mounted, and in a raised edge 30d formed at the rear end of the lower cover 30, three comb-teeth-like clamping tongue-pieces 30e, 30f, and 30g are formed. In addition, the raised edge 30d is formed so as to avoid portions opposing an I/F male connector 13 and a power-supply connector 14.

Among them, bottom parts of the both sides clamping tongue-pieces 30e and 30g are bent so as to form clearances to the central clamping tongue-pieces 30f slightly larger than those equivalent to the plate thickness. The width occupied by the clamping tongue-pieces 30e, 30f, and 30g is set to be substantially the same as the bent width c of the protecting cover 40 formed in the upper cover 41 described above.

Referring to FIG. 34, one end of the protecting cover 41 formed in the upper cover 40 is engaged and clamped with the clamping tongue-pieces 30e, 30f, and 30g formed in the lower cover 30, and the protecting cover 41 covers the stepping motor 201, the terminal base board 201b, and the lead wire 201a. The screws 201c for assembling and adjusting the stepping motor 201 are out of the region of the protecting cover 41 so as to enable to be operated from the side surfaces of the upper and lower covers 5 and 6. Furthermore, since the upper parts of the I/F male connector 421a and the power supply connector 421b are exposed outside from the rear end of the upper cover 40, positions of the both connectors 412a and 412b can be confirmed from the outside.

In addition, the protecting cover 41 for the stepping motor may also be formed separately from the upper cover 40. The lower cover 30 may also be provided with a protecting cover.

Furthermore, the stepping motor 201 and the main control-circuit-board 420 may not be directly connected together with lead wire but terminals of the stepping motor 201 may be connected to an FPC (flexible printed circuit), which in turn is connected to the lead wire.

According to the structure described above, the stepping motor 201, the terminal base board 201b, and the lead wire 201a are protected with the protecting cover 41, so that even when to the I/F male connector 421a and the power supply connector 421b arranged in the vicinity of the stepping motor 201, the external female connector 430 and the power supply plug (not shown) are respectively connected, there are no possibility of damaging the stepping motor 201, the terminal base board 201b, and the lead wire 201a. Therefore, mal-connection between the stepping motor 201 and the main control-circuit-board 420 can be avoided.

Also, since the protecting cover 41 covers only the vicinity of the stepping motor 201, the assembly, adjustment, and connection to the connectors 421a and 42b of the stepping motor 201 can be performed without any hindrance.

INDUSTRIAL APPLICABILITY

As described above, improvements according to the present invention in the horizontal guide mechanism and vertical guide mechanism for restricting the movement of the slider simplify the structure and reduce fabricating cost, and furthermore enable the degree of freedom of the disk drive apparatus to be increased.

What is claimed is:

1. A disk drive apparatus comprising:
   a frame having a frame bottom surface and frame side walls which rise from both sides of the frame bottom surface;
   a slider having a slider bottom surface and slider side walls which rise from both sides of the slider bottom surface;
   a carrier which holds a disk and which is supported by the slider so as to movable in the vertical direction; and
   a horizontal guide mechanism and a vertical guide mechanism, which are arranged between the frame and the slider for slidably guiding the slider,
   wherein the horizontal guide mechanism comprises an engaging piece disposed in at least one of the frame and the slider, and an engaging hole which is disposed in the other and which is engaged with the engaging piece,
   wherein the one of the frame and the slider that has the engaging piece formed therein is made of a metallic sheet material and the engaging piece is made by bending a part of the metallic sheet material, the engaging piece having an extending part in the thickness direction of the metallic sheet material for adjusting clearances to the side edges of the engaging hole, wherein the thickness of the cross-section of the extending part is larger than the thickness of the cross-section of the engaging piece, as measured in the horizontal direction.

2. An apparatus according to claim 1, wherein the engaging hole comprises a plurality of guide parts for restricting the movement of the engaging piece in at least two horizontal directions except the sliding direction of the slider.

3. An apparatus according to claim 2, wherein the engaging piece is engaged with the guide parts on both surfaces of the metallic sheet material so that the movement of the engaging piece in at least two horizontal directions is restricted.

4. An apparatus according to claim 3, wherein the slider comprises a pressable eject button mounted thereon, and the engaging hole and the engaging piece are arranged in the vicinity of the eject button.

5. An apparatus according to claim 1, wherein the engaging hole is formed on the frame bottom surface and the engaging piece is formed on the slider bottom surface.

6. An apparatus according to claim 1, wherein the vertical guide mechanism is arranged between the frame side wall and the slider side wall.

7. A disk drive apparatus comprising:
   a frame having a frame bottom surface and frame side walls which rise from both sides of the frame bottom surface;
   a slider having a slider bottom surface and slider side walls which rise from both sides of the slider bottom surface;
   a carrier which holds a disk and which is supported by the slider so as to be movable in the vertical direction; and
   a horizontal guide mechanism and a vertical guide mechanism, which are arranged between the frame and the slider for slidably guiding the slider,
   wherein the horizontal guide mechanism comprises an engaging piece disposed in at least one of the frame and the slider, and an engaging hole which is disposed in the other and which is engaged with the engaging piece,
   wherein the one of the frame and the slide that has the engaging piece formed therein is made of a metallic sheet material and the engaging piece is made by bending a part of the metallic sheet material, and an urging member for urging the slider,
   wherein the frame is provided with an urging-member retainer formed from the frame by cut-up for retaining the urging member, and wherein the engaging hole is formed in the frame so as to continue from an opening formed when the urging-member retainer is formed by cut-up.

8. A disk drive apparatus comprising:

a frame having a frame bottom surface and frame side walls which rise from both sides of the frame bottom surface;

a slider having a slider bottom surface and slider side walls which rise from both sides of the slider bottom surface;

a carrier which holds a disk and which is supported by the slider so as to be movable in the vertical direction; and a horizontal guide mechanism and a vertical guide mechanism, which are arranged between the frame and the slider for slidably guiding the slider, wherein the horizontal guide mechanism comprises an engaging hole disposed on the frame bottom surface and an engaging piece which is disposed in the slider and which is engaged with the engaging hole, wherein the frame is provided with a positioning part, formed by cut-up for positioning and supporting the disk, and wherein the engaging hole is formed so as to continue from an opening formed when the positioning part is formed by cut-up.

9. An apparatus according to claim 8, wherein the slider is made of a metallic sheet material and the engaging piece is made by bending part of the metallic sheet material.

* * * * *